US012659904B2

(12) United States Patent
    Xu et al.

(10) Patent No.: US 12,659,904 B2
(45) Date of Patent: Jun. 16, 2026

(54) VERTICAL APPLICATION IN EDGE COMPUTING

(71) Applicant: Telefonaktiebolaget LM Ericsson (publ), Stockholm (SE)

(72) Inventors: Wenliang Xu, Shanghai (CN); Hubert Przybysz, Hägersten (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 299 days.

(21) Appl. No.: 18/260,240

(22) PCT Filed: Dec. 8, 2021

(86) PCT No.: PCT/CN2021/136443
    § 371 (c)(1),
    (2) Date: Jun. 30, 2023

(87) PCT Pub. No.: WO2022/151875
    PCT Pub. Date: Jul. 21, 2022

(65) Prior Publication Data
    US 2024/0298286 A1      Sep. 5, 2024

(30) Foreign Application Priority Data

Jan. 13, 2021    (WO) ................ PCT/CN2021/071405

(51) Int. Cl.
    *H04W 48/16*        (2009.01)
    *H04W 48/18*        (2009.01)
    *H04W 60/04*        (2009.01)
(52) U.S. Cl.
    CPC ........... *H04W 60/04* (2013.01); *H04W 48/16* (2013.01); *H04W 48/18* (2013.01)

(58) Field of Classification Search
    CPC ....... H04W 88/18; H04W 4/50; H04W 24/02; H04W 80/10; H04W 28/0226;
    (Continued)

(56) References Cited

U.S. PATENT DOCUMENTS

2017/0006466 A1 *   1/2017   Midkiff ................. H04W 76/12
2021/0352511 A1 *  11/2021   Lee ....................... H04L 67/125

FOREIGN PATENT DOCUMENTS

WO      WO-2021071987 A1 *   4/2021   ............ H04W 24/02

OTHER PUBLICATIONS

3GPP TR 23.745 V1.2.0, "3rd Generation Partnership Project; Technical Specification Group Services and System Aspects; Study on application layer support for Factories of the Future in 5G network; (Release 17)," Nov. 2020, 73 pages, 3GPP Organizational Partners.

(Continued)

*Primary Examiner* — Quan M Hua

(74) *Attorney, Agent, or Firm* — Nicholson De Vos Webster & Elliott LLP

(57)                ABSTRACT

The disclosure herein relate to vertical application in edge computing. A method performed by a first network function implementing Edge Enabler Server (EES) in an Edge Data Network (EDN). The method comprises receiving, from a second network function implementing Edge Application Server (EAS) in the EDN, a registration request message comprising information indicating a first list of associated EAS information. Based on the associated EAS information, the UE performs a joint EAS discovery and selection for vertical application in an edge deployment, thus both application enabler client in the UE and application specific server communicates with the same application enabler server.

17 Claims, 11 Drawing Sheets

(58) Field of Classification Search
CPC . H04W 28/12; H04W 36/0011; H04W 40/02;
H04W 40/248; H04W 8/18; H04W 80/12;
H04W 84/005; H04W 84/02; H04W
60/00; H04W 60/04; H04W 28/0831;
H04W 76/15; H04W 36/0033; H04W
88/182; H04W 36/12; H04W 4/24; H04W
48/02; H04W 48/14; H04W 76/10; H04W
76/12; H04W 8/00; H04W 8/005; H04W
84/00; H04W 64/003
See application file for complete search history.

(56) References Cited

OTHER PUBLICATIONS

3GPP TS 22.104 V17.4.0, "3rd Generation Partnership Project; Technical Specification Group Services and System Aspects; Service requirements for cyber-physical control applications in vertical domains; Stage 1 (Release 17)," Sep. 2020, 76 pages, 3GPP Organizational Partners.
3GPP TS 22.261 V18.1.0, "3rd Generation Partnership Project; Technical Specification Group Services and System Aspects; Service requirements for the 5G system; Stage 1 (Release 18)," Dec. 2020, 85 pages, 3GPP Organizational Partners.
3GPP TS 23.222 V17.3.0, "3rd Generation Partnership Project; Technical Specification Group Services and System Aspects; Functional architecture and information flows to support Common API Framework for 3GPP Northbound APIs; Stage 2 (Release 17)," Dec. 2020, 115 pages, 3GPP Organizational Partners.
3GPP TS 23.434 V17.0.0, "3rd Generation Partnership Project; Technical Specification Group Services and System Aspects; Service Enabler Architecture Layer for Verticals (SEAL); Functional architecture and information flows; (Release 17)," Dec. 2020, 127 pages, 3GPP Organizational Partners.
3GPP TS 23.501 V16.7.0, "3rd Generation Partnership Project; Technical Specification Group Services and System Aspects; System architecture for the 5G System (5GS); Stage 2 (Release 16)," Dec. 2020, 450 pages, 3GPP Organizational Partners.
3GPP TS 23.558 V1.2.0, "3rd Generation Partnership Project; Technical Specification Group Services and System Aspects; Architecture for enabling Edge Applications; (Release 17)," Nov. 2020, 131 pages, 3GPP Organizational Partners.
3GPP TS 33.434 V16.1.0, "3rd Generation Partnership Project; Technical Specification Group Services and System Aspects; Security aspects of Service Enabler Architecture Layer (SEAL) for verticals; (Release 16)," Sep. 2020, 24 pages, 3GPP Organizational Partners.
D. Hardt, "The OAuth 2.0 Authorization Framework," Oct. 2012, 76 pages, Internet Engineering Task Force (IETF), Request for Comments: 6749.
International Search Report and Written Opinion, PCT App. No. PCT/CN2021/136443, Feb. 25, 2022, 15 pages.

* cited by examiner

100

300

301

302

| UE | 3GPP Core Network | Edge Data Network |

Application Client(s) 312

Application Data Traffic

Edge Application Server(s) 322

EDGE-7

EDGE-5

EDGE-3

Edge Enabler Client 311

EDGE-1

EDGE-2

Edge Enabler Server(s) 321

EDGE-9

EDGE-6

EDGE-4

EDGE-8

Edge Configuration Server

303

304

500

501

1000

1100

1200

1300

1400

1500

1600

1700

VERTICAL APPLICATION IN EDGE COMPUTING

CROSS-REFERENCE TO RELATED APPLICATIONS

This application is a National stage of International Application No. PCT/CN2021/136443, filed Dec. 8, 2021, which claims priority to International Application No. PCT/CN2021/071405, filed Jan. 13, 2021, which are hereby incorporated by reference.

TECHNICAL FIELD

The embodiments herein relate generally to the field of communication, and more particularly, the embodiments herein relate to vertical application in edge computing.

BACKGROUND

Vertical Application & SEAL

FIG. 1 is a schematic block diagram showing architecture 100 for 5G vertical application proposed by 3GPP SA6 Working Group. In 3GPP Release 16, Service Enabler Architecture Layer (SEAL) 112 has been introduced to support vertical applications (e.g. Vehicle to Everything (V2X) applications).

3GPP TS 23.434 specifies application plane and signaling plane entities for application-enabling services (e.g. group management, configuration location management, management, identity/key management, network resource management); that can be reused across vertical applications. SEAL also specifies the northbound Application Programming Interfaces (API) for its individual services—to enable flexible integration with vertical applications.

To enable smart factory in manufacturing, 3GPP SA6 Working Group is also studying the application-enabling services aiming to the general applicability of Factories of the Future (FF) based on service requirements of cyber-physical control applications identified in 3GPP TS 22.104 and 3GPP TS 22.261, and develop corresponding solutions to ensure the efficient use and deployment of application layer support for FF in 5G networks. The study is captured in 3GPP TR 23.745.

Factories of the Future (FF)

For FF Application (APP), one proposed architecture (clause 7.1 of TR 23.745) in the study is shown in FIG. 2, which is a schematic block diagram showing application layer architecture 200 for FF.

The FF application layer functional entities 213, 223 for the FF User Equipment (UE) 201 and the FF application server are grouped into the FF application specific layer and the FF Application Enabler (FAE) layer. The FAE layer offers the FAE capabilities to the FF application specific layer. The FF application specific layer consists of the FF application specific functionalities.

The FF application server (AS) consists of the FAE server 222 and the FF application specific server(s) 223. The FAE server 222 provides the FF application layer support functions to the FF application specific server(s) 223 via FAE-S reference point.

The FF UE 201 consists of the FAE client 212 and the FF application specific client(s) 213. The FAE client 212 provides the FF application layer support functions to the FF application specific client(s) 213 via FAE-C reference point.

The FAE server 222 interacts with another FAE server 222 over FAE-E reference point.

The FAE server 222 (acting as AF) interacts with the 3GPP system 202 such as 5G System (5GS) over N5 reference point as specified in 3GPP TS 23.501 [7]. The FAE server 222 interacts with the 3GPP system 202 (such as 5GS) over N33 reference point as specified in 3GPP TS 23.501 [7].

The FF application specific server(s) 223 and FF application enabler server 222 consume SEAL services provided by SEAL server(s) 221 over SEAL-S reference point. The FF application specific client(s) 213 and FF application enabler client 212 consume SEAL services provided by SEAL client(s) 211 over SEAL-C reference point.

The following SEAL services for FF applications are supported:

Location management as specified in 3GPP TS 23.434;

Group management as specified in 3GPP TS 23.434;

Configuration management as specified in 3GPP TS 23.434;

Identity management as specified in 3GPP TS 23.434;

Key management as specified in 3GPP TS 23.434; and

Network resource management as specified in 3GPP TS 23.434.

EDGE Application

3GPP TS 23.558 specifies the application layer architecture, procedures and information flows necessary for enabling edge applications over 3GPP networks. It includes architectural requirements for enabling edge applications, application layer architecture fulfilling the architecture requirements and procedures to enable the deployment of edge applications.

For edge computing support, the objectives include the development of application layer requirements and architecture for hosting Edge Applications on the Edge Data Network (EDN), including the exposure of northbound APIs towards Edge Applications, and integration of the edge enabling layer with the 3GPP Network.

FIG. 3 is a schematic block diagram showing architecture 300 for enabling edge applications. The EDN 302 is a local Data Network. Edge Application Server(s) (EAS) 322 and the Edge Enabler Server (EES) 321 are contained within the EDN 302. The Edge Configuration Server (ECS) 304 provides configurations related to the EES 321, including details of the EDN 302 hosting the EES 321. The UE 301 contains Application Client(s) 312 and the Edge Enabler Client (EEC) 311. The EAS(s) 322, the EES 321 and the ECS 304 may interact with the 3GPP Core Network 303.

SUMMARY

In the current technical specification, there is lacking of solutions how the vertical applications, e.g. FF specific application (both client and server) can utilize the EDGE application service.

In view of above, the embodiments herein at least propose a consolidated view for the UE to select application servers that are deployed in EDGE, especially when there is certain relationship between those servers, to facilitate the utilization of different applications and enablers in vertical domain.

In an embodiment, there proposes a first method performed by a first network function implementing Edge Enabler Server (EES) in an Edge Data Network (EDN). The method may comprise the step of: receiving, from a second network function implementing Edge Application Server (EAS) in the EDN, a registration request message comprising information indicating a list of associated EAS information.

In another embodiment, there proposes a second method performed by a second network function implementing Edge Application Server (EAS) in an Edge Data Network (EDN). The method may comprise the step of: transmitting, to a first network function implementing Edge Enabler Server (EES) in the EDN, a registration request message comprising information indicating a first list of associated EAS information.

In yet another embodiment, there proposes a third method performed by a first network function implementing Edge Enabler Server (EES) in an Edge Data Network (EDN). The method may comprise the step of: receiving, from a functional component of a User Equipment (UE), a first message for discovering at least one second network function implementing Edge Application Server (EAS) in the EDN. The method may further comprise the step of: transmitting, to the functional component of the UE, a second message including information indicating a first list of associated EAS information.

In yet another embodiment, there proposes a fourth method performed by a first functional component in a User Equipment (UE). The method may comprise the step of: transmitting, to a first network function implementing Edge Enabler Server (EES) in an Edge Data Network (EDN), a first message for discovering at least one second network function implementing Edge Application Server (EAS) in the EDN. The method may further comprise the step of: receiving, from the first network function, a second message including information indicating a first list of associated EAS information.

In yet another embodiment, there proposes a fifth method performed by a second functional component in a User Equipment (UE). The method may further comprise the step of: receiving, from a first functional component in the UE, a message including information indicating a list of associated Edge Application Server (EAS) information.

In yet another embodiment, there proposes a User Equipment (UE), comprising: a plurality of functional components. The plurality of functional components further include: a first functional component implementing an Edge Enabler Client (EEC), a third functional component implementing an application enabler client of a vertical application, and a fourth functional component implementing an application specific client of the vertical application. The third functional component may provide at least one service to one or more fourth functional components. The first functional component and the third functional component may communicate via EDGE-5 reference point to enable the at least one service.

In yet another embodiment, there proposes a communication system for vertical application in EDGE deployment, comprising: a plurality of network functions in an Edge Data Network (EDN). The plurality of network functions further include a first network function implementing an Edge Enabler Server (EES), a third network function implementing an application enabler server of a vertical application, and a fourth network function implementing an application specific server of the vertical application. The third network function may provide at least one service to one or more fourth network functions. The first network function and the third network function may communicate via EDGE-3 reference point to enable the at least one service.

In yet another embodiment, there proposes a first network function implementing Edge Enabler Server (EES) in an Edge Data Network (EDN). The EES comprises at least one processor and a non-transitory computer readable medium coupled to the at least one processor. The non-transitory computer readable medium contains instructions executable by the at least one processor, whereby the at least one processor is configured to perform the above first method and third method.

In yet another embodiment, there proposes a second network function implementing Edge Application Server (EAS) in an Edge Data Network (EDN). The EAS comprises at least one processor and a non-transitory computer readable medium coupled to the at least one processor. The non-transitory computer readable medium contains instructions executable by the at least one processor, whereby the at least one processor is configured to perform the above second method.

In yet another embodiment, there proposes a User Equipment (UE), comprising: at least one processor and a non-transitory computer readable medium coupled to the at least one processor. The non-transitory computer readable medium contains instructions executable by the at least one processor, whereby the at least one processor is configured to perform the above fourth method and fifth method.

In yet another embodiment, there proposes a computer readable medium comprising computer readable code, which when run on an apparatus, causes the apparatus to perform any of the above method.

In yet another embodiment, there proposes a computer program product comprising computer readable code, which when run on an apparatus, causes the apparatus to perform any of the above method.

With embodiments herein, based on the associated EAS information, the UE may perform a joint EAS discovery and selection for vertical application in an edge deployment, thus both application enabler client in the UE and application specific server may communicate with the same application enabler server.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements, and in which.

DETAILED DESCRIPTION OF EMBODIMENTS

Figure 1:
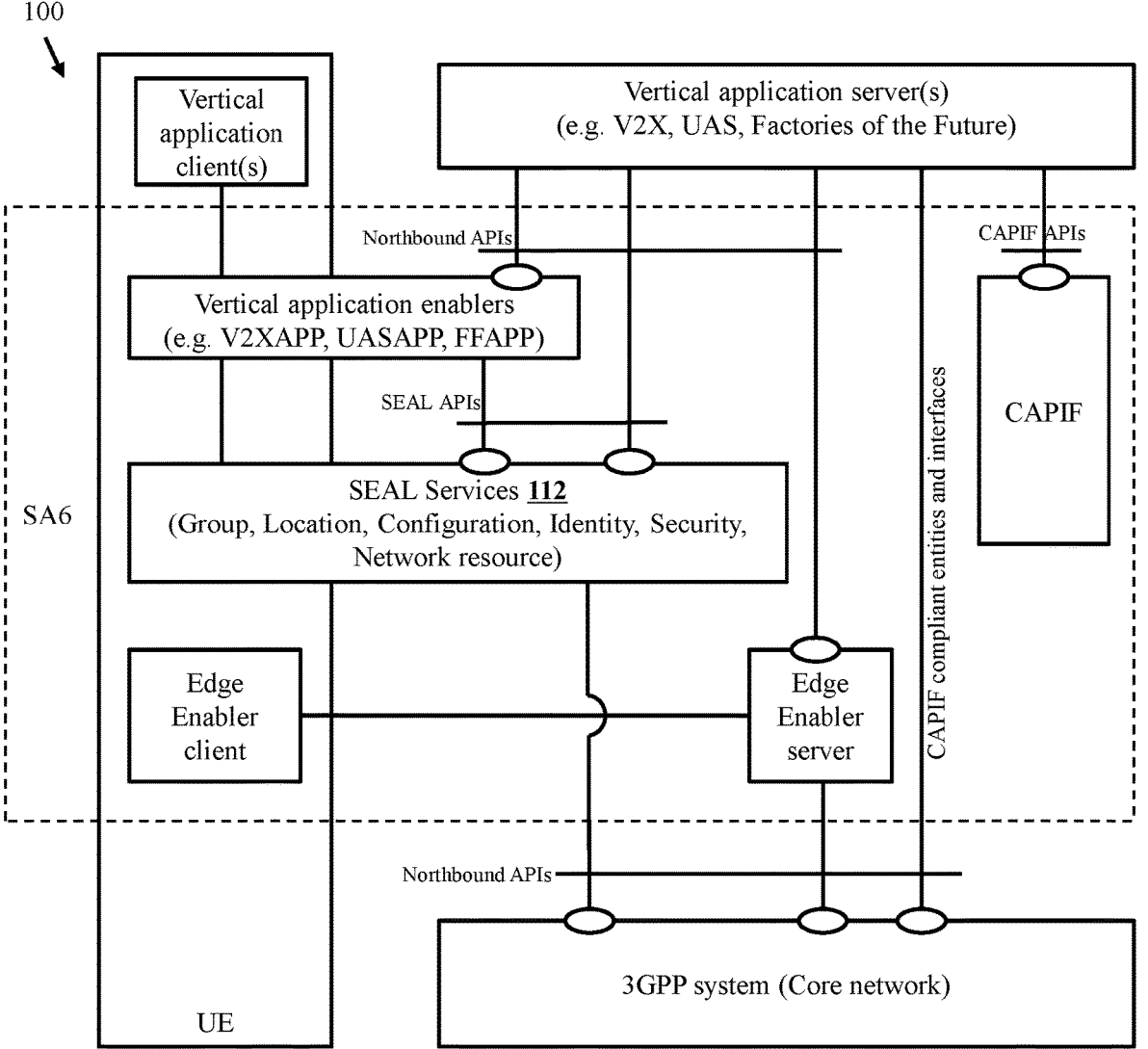
FIG. 1 is a schematic block diagram showing architecture for 5G vertical application proposed by 3GPP SA6 Working Group.
Figure 2:
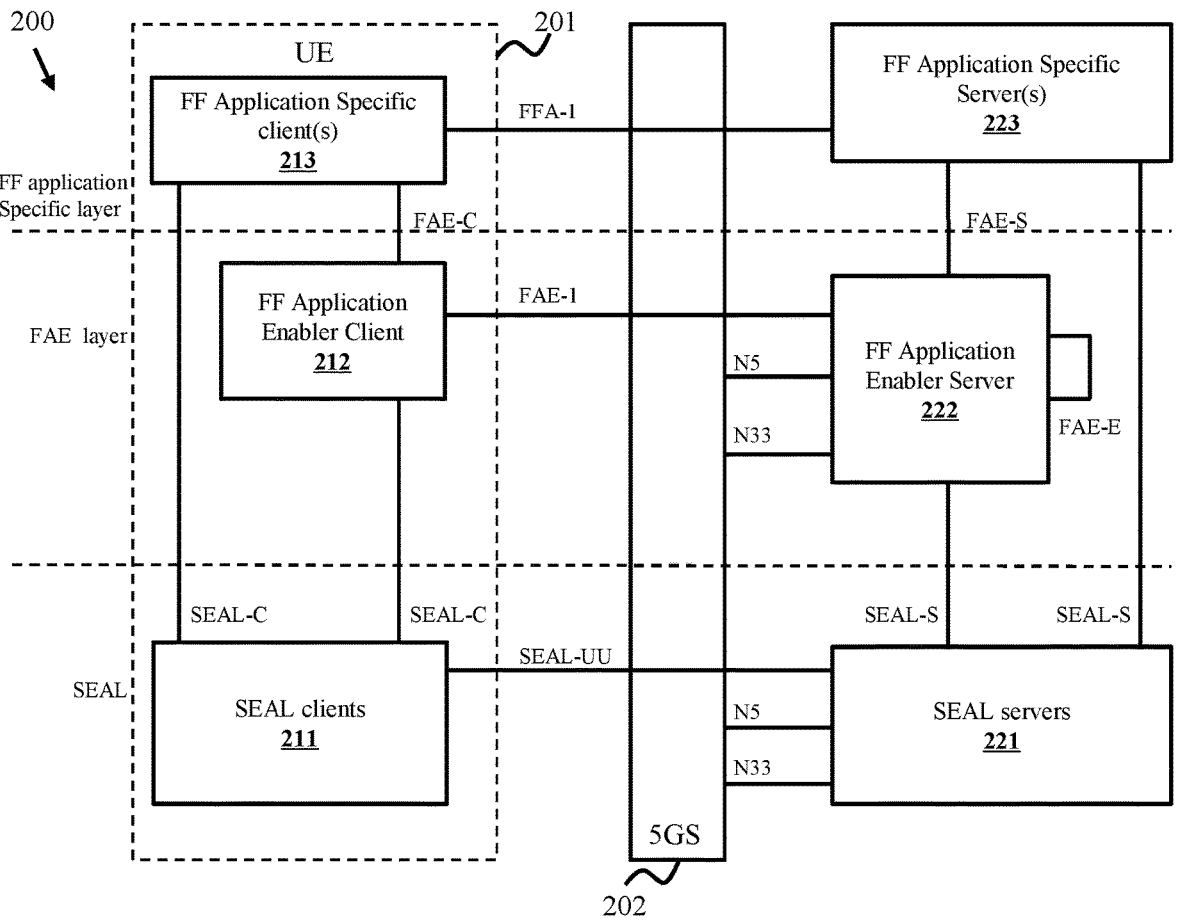
FIG. 2 is a schematic block diagram showing application layer architecture for FF.
Figure 3:
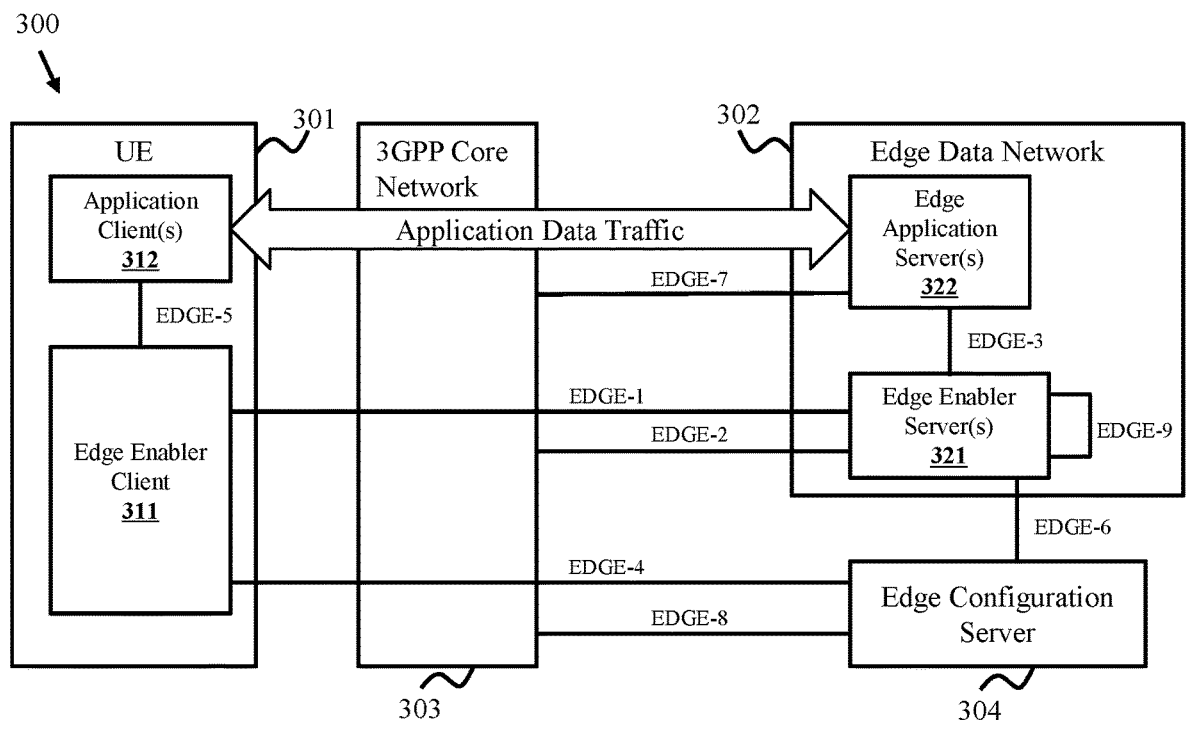
FIG. 3 is a schematic block diagram showing architecture for enabling edge applications.

Embodiments herein will be described in detail hereinafter with reference to the accompanying drawings, in which embodiments are shown. These embodiments herein may, however, be embodied in many different forms and should not be construed as being limited to the embodiments set forth herein. The elements of the drawings are not necessarily to scale relative to each other.

Reference to "one embodiment" or "an embodiment" means that a particular feature, structure or characteristic described in connection with the embodiment is included in at least one embodiment. Thus, the appearances of the phrase "in an embodiment" appearing in various places throughout the specification are not necessarily all referring to the same embodiment.

The term "A, B, or C" used herein means "A" or "B" or "C"; the term "A, B, and C" used herein means "A" and "B" and "C"; the term "A, B, and/or C" used herein means "A", "B", "C", "A and B", "A and C", "B and C" or "A, B, and C".

Hereafter, Future Factory application will be described as one example of vertical applications in one embodiment of present disclosure.

There is Key Issue #9 described in TR 23.745, clause 5.9: the existing solutions #5 and #6 put FF enabler (client & server) as EAS in the context of EDGE APP architecture. However, it is unclear how the FF specific application (client & server) can utilize the EDGE APP service.

According to the TS 22.104 clause 5.1, a local approach for the communication service on the network side is preferred to reduce the latency (between UE to UE via Uu and UE to network server) or to keep sensitive data in a non-public network on the factory site. Then, there is still an issue: how to support FFAPP communications over Edge deployments on network side.

In FFAPP TR 23.745, according to solution #4 (for device onboarding support), the FAE client 212 registers to the FAE server 222 via FAE-1 reference point. The FF application specific client 213 registers to the FAE client 212 via FAE-C reference point. And the FF application specific server 223 registers to the FAE server 222 via FAE-S reference point.

The FFAS server 223 needs to register in the FAE server 222 and FAE client 212 also needs to register in the FAE server 222 according to solution #4. However, from UE point of view, under the edge deployment, if EAS discovery service provided by EDGE APP is used but the selection of FFAS server 223 and FAE server 222 is handled separately, it is possible that the selected FAE server 222 doesn't hold the registered FFAS server 223 so that some functions cannot work as expected. For example, the FF application specific server 223 cannot discover FF device application management related IEs stored in the FAE client 212 via the FAE server 222; or the FAE client 212 cannot send device application management operation result to the FF application specific server 223 via the FAE server 222.

In general, with edge deployment, if the application enabler client in the UE and the application specific server need to communicate with the same application enabler server, the selection of the application enabler server and the application specific server is lacking certain cooperation.

In view of the above problem, the embodiments herein provide additional information of associated EAS information in EAS registration procedure, to describe the relationship between servers. The additional information may help the UE to select appropriate EAS(s) with a consolidated view.

Edge Computing for FFAPP

This solution in this disclosure corresponds to the above key issue #9—communication service on the Edge deployments. The "table number" "subclause number" etc. are in 3GPP TR 23.745 V1.2.0.

The EDGEAPP architecture is specified in 3GPP TS 23.558 [10]. The EDGE-5 reference point details are not specified in Rel-17.

Figure 4:
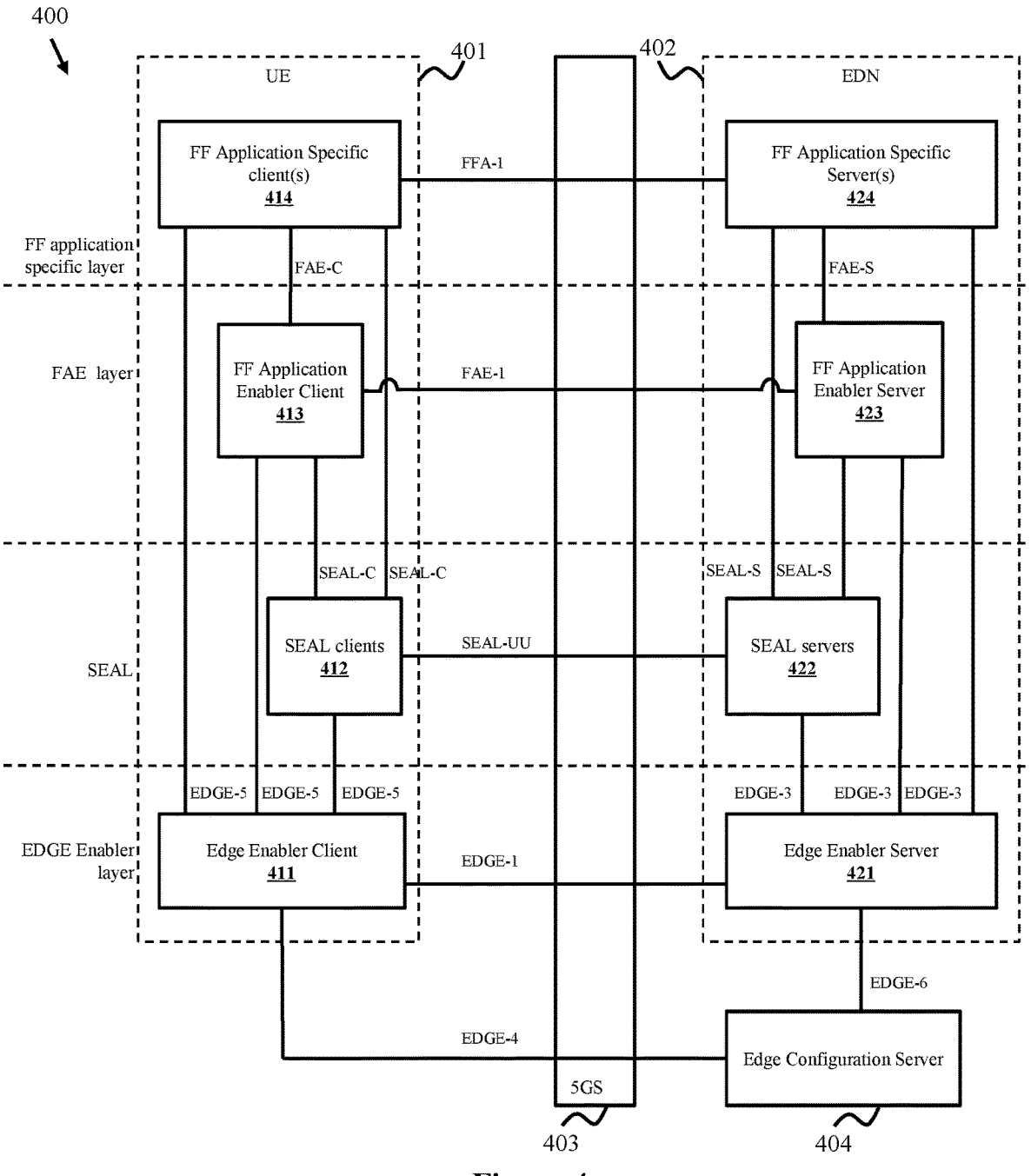
FIG. 4 is a schematic block diagram showing an example wireless communication system, in which the embodiments herein may be implemented.

FIG. 4 illustrates the edge deployment 400 example for the FF APP. For simplicity, the reference points between enabler server and 5GS are omitted, and the reference points for inter-enabler server communication in the same enabler layer are also omitted. At UE 401 side, FF Application Specific client(s) 414 and FAE client 413 interact with the Edge Enabler Client (EEC) 411 via EDGE-5 reference point. In an Edge Data Network (EDN) 402, the Edge Application Server (EAS), e.g. FF Application Specific Server 424 and FF Application Enabler server 423, interacts with the Edge Enabler Server (EES) 421 via EDGE-3 reference point, for instance, to register its profile into the EES 421. The EEC 411 interacts with the Edge Configuration Server (ECS) 404 via EDGE-4 reference point, for instance, to discover candidate EES(s). The EEC 411 interacts with the EES 421 via EDGE-1 reference point, for instance, to discover candidate EAS(s) (e.g. FF Application Specific Server 424 and FF Application Enabler Server 423) and provide the discovered EAS(s) to the Application Client (e.g. FF Application Specific client 414 and FF Application Enabler client 413).

In an EDN 402, there could be several EES(s) provided by the same or different Edge Computing Service Provider (ECSP). The FFAS sever(s) 424 and FAE server 423 shall be able to discover and register into an appropriate EES 421. If CAPIF is used, this can be done by utilizing the AEF serving area and/or the AEF location as described in 3GPP TS 23.222 [16]; otherwise, local configuration of the EES endpoint may be used.

In sol #4, the FFAS server 424 needs to register into the FAE server 423 and FAE client 413 needs to register into the FAE server 423 during onboarding process. Similarly, the FFAS server 424 shall be able to discover and register into an appropriate FAE server 423. Ideally, the FFAS server 424, the FAE server 423 and the EES 421 are all located in the same area to achieve low latency communication between servers in an edge deployment. But from UE point of view, under the edge deployment, if EAS discovery service provided by EDGE enabler 411/421 is used but the selection of the FFAS server 424 and FAE server 423 are handled separately, it is possible that the selected FFAS server 424 is not on-boarded on the selected FAE server 423 so that certain function cannot work; e.g. the FF application specific server 424 cannot discover FF device application management related IEs stored in the FAE client 413, or the FAE client 413 cannot send device application management operation result to the FF application specific server 424.

In order to enable the selection of a FFAS server 424 and its onboarding FAE server 423, in an edge deployment, the FFAS server 424 and the FAE server 423 need to exchange its application server information during onboarding. After both sides stored the associated application server information, the FAE server 423 and FFAS server 424 register in the EES 421 via EDGE-3 reference point. And consequently, the EEC 411, based on the interaction with FAE client 413 over EDGE-5 reference point, can discover a list of candidate FAE server(s) 423 including its associated FFAS server(s) 424 and a list of candidate FFAS server(s) 424 including its associated FAE server(s) 423.

For SEAL, there is no such association between the VAL server 423, 424 and the SEAL servers 422 due to loosely administrative procedure specified in 3GPP. For SEAL Identity Management (IM) function, before the SEAL IM client 412 is granted with any token from the SEAL IM server 422, the SEAL IM client 412 needs to register in the SEAL IM server 422 as described in 3GPP TS 33.434 [TS33434]. If there is any interaction between the VAL server 423, 424 and SEAL IM server 422 for token validation purpose which is out the scope of 3GPP (and also IETF RFC 6749 [rfc6749]), the EAS discovery needs to take into consideration for the association between the VAL server (e.g. FAE server 423) and the SEAL IM server 424.

In the UE 401, there are several ways to achieve the selection of associated EAS servers 422, 423, 424, below list describes two alternatives for information purpose since both FAE-C and EDGE-5 are not detailed within Rel-17 timeline:

a. The FFAS client 414 discovers the FFAS server(s) 424 and the FAE client 413 discovers the FAE server(s) 423 separately via EDGE-5 reference point. The final selection of the FFAS server 424 and the FAE server 423 relies on the coordination between the FFAS client 414 and FAE client 413 via FAE-C reference point.

b. The FFAS client 414 can also delegate the discovery of FFAE server 424 to the FAE client 413 via FAE-C reference point, and then the FAE client 413 triggers the discovery (possibly with the request to discover FAE server 423 together) and further selects the FFAE server 424 matching the selected FAE server 423 from the discovered result.

According to 3GPP TS 23.558 [10], the EEC 411 may narrow down the number of discovered application server(s) 422, 423, 424 when providing the discovery result to the application client 412, 413, 414. If such function in the EEC 411 is used (e.g. being delegated by the application client 412, 413, 414), the EEC 411 shall not narrow down the number of discovered application servers 422, 423, 424 solely based on a single application which has associated EAS information.

Table 1 shows the impact in the EAS profile which includes a list of associated EAS information (in bold and italic). In the profile of FFAE server 424, the onboarded FAE server 423 is provided as parent EAS. In the profile of FAE server 423, one or more onboarded FFAS servers 424 are provided as child EAS.

TABLE 1

Edge Application Server Profile

| Information element | Status | Description |
| --- | --- | --- |
| EAS ID | M | The identifier of the EAS |
| EAS Endpoint | M | Endpoint information (e.g. URI, FQDN, IP address) used to communicate with the EAS. This information maybe discovered by EEC and exposed to Application Clients so that application clients can establish contact with the EAS. |
| . . . | . . . | . . . |
| *A list of associated EAS information* | *O* | *A list of associated EAS(s) including EAS application ID, its endpoint information and the relationship (parent, child or sibling).* |

Note that the other EDGE-3 exposure services are not re-exposed by the FAE server 423 or SEAL servers 422 to the FFAS server 424, for instance, the FFAS server 424 directly consumes location or QOS API provided by the EES 421.

Solution Evaluation

This solution addresses Key Issue #9 for "How to support FFAPP communications over Edge deployments" and provides a deployment option for the FF application in the EDGE application architecture.

In such deployment, if there is a relationship between the FFAS server 424 and FAE server 423 with respect to the onboarding process, the associated EAS information needs to be provided during EAS registration procedure and the UE 401 needs to select the suitable application servers with joint consideration in the associated application server.

Furthermore, the EEC 411 may indicate explicitly for the EAS association in the EAS discovery request or EAS discovery subscription request so that only the EAS(s) 422, 423, 424 having any EAS association will be discovered.

The benefit of this is to narrow down the number of discovered EAS(s) 422, 423, 424 in the discovery response/notification so that the UE 401 may process less information in selection of the EAS(s) 422, 423, 424 with a consolidated view.

As mentioned above, FIG. 4 is a schematic block diagram showing an example wireless communication system 400, in which the embodiments herein may be implemented. In particular, FIG. 4 shows the FF APP in an Edge deployment.

EDGE-1 reference point in FIG. 4 enables interactions between the EES 421 and the EEC 411. It supports: a) registration and de-registration of the EEC 411 to the EES 421; b) retrieval and provisioning of EAS configuration information; and c) discovery of EASs available in the EDN 402.

EDGE-3 reference point in FIG. 4 enables interactions between the EES 421 and the EASs 422, 423, 424. It supports: a) registration of EASs 422, 423, 424 with availability information (e.g. time constraints, location constraints); b) de-registration of EASs 422, 423, 424 from the EES 421; c) discovery of target EAS information to support application context transfer; d) providing access to network capability information (e.g. location information, Quality of Service (QOS) related information); and e) requesting the setup of a data session between Application Client 412, 413, 414 and EAS 422, 423, 424 with a specific QoS.

Note that, in the example herein, the SEAL server 422, the FAE server 423, and the FFAS server 424 all may acts as EAS from the view point of the EES 421, thus the SEAL server 422, the FAE server 423, and the FFAS server 424 may also be referred as EAS 422, EAS 423, and EAS 424 respectively. Similarly, the SEAL client 412, FAE client, and FFAS client 414 may be referred as application client 412, 413, 414 respectively.

Figure 5:
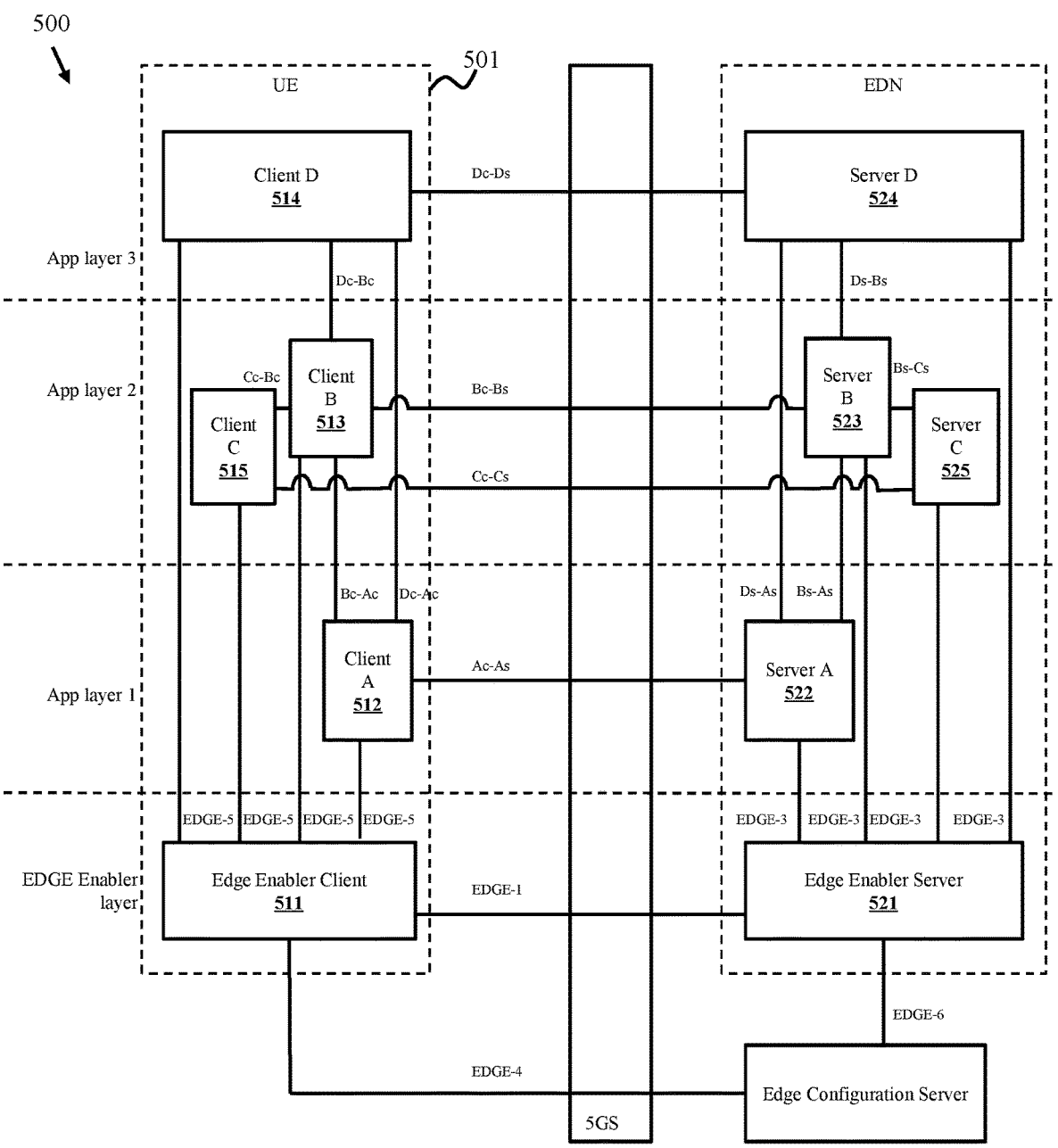
FIG. 5 is a schematic block diagram showing a more generic Edge deployment for vertical applications.

FIG. 5 is a schematic block diagram showing a more generic Edge deployment 500 for vertical applications. In details, FIG. 5 shows an Edge deployment option to support applications (application specific server and its enabler server) in Vertical domain (e.g. Factories of the Future, Vehicle to Everything, Unmanned Aerial System). In FIG. 5, different application clients and servers are divided in different application layers.

In FIG. 5, the reference point name between two entities is a string concatenated with dash delimiter between two entity names in capital letter followed by a single character c or s (standing for client or server correspondingly).

As shown in FIG. 5, server B 523 has association with server D 524 as child EAS, with server C 525 as sibling EAS and with server A 522 as parent EAS; server D 524 has association with server B 523 as parent EAS; sever C 525 has association with server B 523 as sibling EAS; and server A 522 has association with server B 523 as child EAS.

As shown in FIGS. 4 and 5, the embodiments herein propose network architectures for vertical application in Edge deployment.

In an embodiment, there proposes a User Equipment (UE), comprising: a plurality of functional components. For example, the plurality of functional components may include: a first functional component implementing an Edge Enabler Client (EEC); and a second functional component implementing an Application Enabler Client of the vertical application. In an embodiment, the first functional component and the second functional component may communicate via EDGE-5 reference point.

In an embodiment, the UE may further comprise a third functional component implementing an application specific client of the vertical application. The first functional component and the third functional component may communicate via EDGE-5 reference point. The second functional component and the third functional component may communicate via AE-C reference point.

In an embodiment, the UE may further comprise a fourth functional component implementing a Service Enabler Architecture Layer (SEAL) client for the vertical application. The first functional component and the fourth functional component may communicate via EDGE-5 reference point. The second functional component and the fourth functional component may communicate via SEAL-C reference point. The second functional component and the fourth functional component may communicate via SEAL-C reference point.

In an embodiment, the vertical application is any one of Factories of the Future (FF), Vehicle to Everything (V2X), Unmanned Aerial System (UAS), and Smart Grid.

In an embodiment, the functional first component may communicate with a first network function implementing an Edge Enabler Server (EES) via Edge-1 reference point. The second functional component may communicate with a second network function implementing an Application Enabler Server of the vertical application via AE-1 reference point. The third functional component may communicate with a third network function implementing an application specific server of the vertical application via VA-1 reference point. For example, the VA-1 reference point may be a reference point between the application specific client and the application specific server. The fourth functional component may communicate with a fourth network function implementing a Service Enabler Architecture Layer (SEAL) server of the vertical application via SEAL-UU reference point.

In an embodiment, there further proposes a communication system for vertical application in EDGE deployment, comprising: a plurality of network functions in an Edge Data Network (EDN). The plurality of network functions may include a first network function implementing an Edge Enabler Server (EES); and a second network function implementing an Application Enabler Server of the vertical application. The first network function and the second network function communicate via EDGE-3 reference point.

In an embodiment, the communication system may further comprise: a third network function implementing an application specific server of the vertical application. The first network function and the third network function may communicate via EDGE-3 reference point. The second network function and the third network function may communicate via AE-S reference point.

In an embodiment, the communication system may further comprise: a fourth network function implementing a Service Enabler Architecture Layer (SEAL) server for the vertical application. The first network function and the fourth network function may communicate via EDGE-3 reference point. The second network function and the fourth network function may communicate via SEAL-S reference point. The second network function and the fourth network function may communicate via SEAL-S reference point.

In an embodiment, the vertical application is any one of Factories of the Future (FF), Vehicle to Everything (V2X), Unmanned Aerial System (UAS), and Smart Grid.

In an embodiment, the first network function may communicate with a first functional component implementing an Edge Enabler Client (EEC) via Edge-1 reference point. The second network function may communicate with a second functional component implementing an Application Enabler Client of the vertical application via AE-1 reference point. The third network function may communicate with a third functional component implementing an application specific client of the vertical application via VA-1 reference point. For example, the VA-1 reference point may be a reference point between the application specific client and the application specific server. The fourth network function may communicate with a fourth functional component implementing a Service Enabler Architecture Layer (SEAL) client of the vertical application via SEAL-UU reference point.

In some embodiments, each EAS 422, 423, 424, 522, 523, 524, 525 registers into the EES 421, 521 (see the messages in FIG. 6 below) with the profile of itself and optional the associated EAS information, so that after EAS discovery (see the messages in FIGS. 7 and 8 below), the UE 401, 501 can have a joint consideration in selecting the edge application servers 422, 423, 424, 522, 523, 524, 525 having management relationship with each other. For example, there may be a coordination between the client B 513 and client D 514 via for example Dc-Bc reference point, so that the selected server B 523 and server D 524, which are used for client B 513 and client D 514 respectively, are associated.

In some embodiment, only one EAS 422, 522 in the root or bottom layer needs to register into the EES 421, 521 (see the messages in FIG. 6 below) on behalf of its children 423, 424, 523, 524 and its siblings. In the onboarded EAS profile, it may further include a list of onboarded EAS profiles. Simply put, this is an embedded EAS profile in another EAS profile which may include several layers.

Table 2 shows the impact in the EAS profile which includes a list of onboarded EAS profiles (in bold and italic).

TABLE 2

| Edge Application Server Profile | | |
| --- | --- | --- |
| Information element | Status | Description |
| EAS ID | M | The identifier of the EAS |
| EAS Endpoint | M | Endpoint information (e.g. URI, FQDN, IP address) used to communicate with the EAS. This information maybe discovered by EEC and exposed to Application Clients so that application clients can establish contact with the EAS. |
| . . . | . . . | . . . |
| A list of onboarded EAS profiles | O | A list of onboarded EAS profiles. |

In some embodiments, in the UE 401, 501, the EEC 411, 511 takes the responsibility for a joint EAS discovery and selection for all clients 412, 413, 414, 512, 513, 514, 515 in the above layers. For example, client D 514 delegates the EAS discovery and selection to the client B 513 and then client B 513 notifies client D 514 the selected server D 524 via the Dc-Bc reference point.

The embodiments are described below by mainly referring the architecture of FIG. 4; the embodiments may similarly applicable to the architecture of FIG. 5 and similar architecture for vertical application(s).

Figure 6:
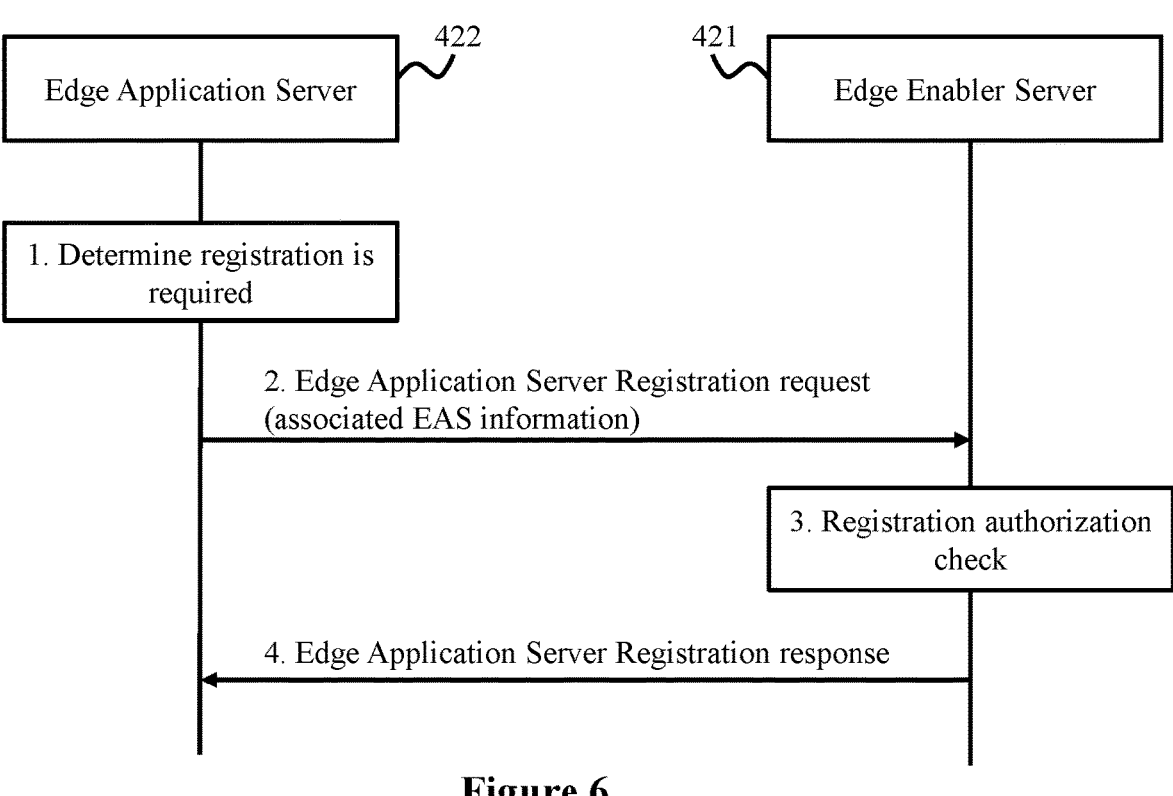
FIG. 6 is a schematic signaling chart showing the messages in the vertical EAS registration in EDGE deployment.

FIG. 6 is a schematic signaling chart showing the messages in the vertical EAS registration in EDGE deployment.

In an embodiment, the following pre-conditions are satisfied before performing the vertical EAS registration.

(1). The EAS 422 has been configured with an EAS Identity;

(2). The EAS 422 has been configured with the address (e.g. URI) of the EES 421; and (3). Both the EAS 422 and EES 421 have the necessary credentials to enable communications.

In an embodiment, the signaling chart in FIG. 6 may include the following messages or steps:

Step 1. The EAS 422 determines that registration to the EES 421 is needed (e.g. the EAS 422 is instantiated and started up).

Step 2. The EAS 422 sends an edge application server registration request to the EES 421. The request may include the EAS profile and may include proposed expiration time for the registration.

In an embodiment, the request may also include the associated EAS information to register the association between the EASs 422, 423, 424. For example, the information regarding the EAS profile in the above table 1 or table 2 may be included in the request. As a result, in a subsequent EAS discovery procedure, the UE 401 may discover the association between the EASs 422, 423, 424, which may be used for selecting the EASs 422, 423, 424 in a joint consideration.

Step 3. The EES 421 performs an authorization check to verify whether the EAS 422 has the authorization to register on the EES 421.

Step 4. Upon successful authorization, the EES 421 stores the EAS Profile for later use (e.g. for serving Edge Application Server discovery requests received from EECs 411, etc.) and replies to the EAS 422 with an edge application server registration response. The EES 421 may provide an expiration time to indicate to the EAS 422 when the registration will automatically expire. To maintain the registration, the EAS 422 shall send a registration update request prior to the expiration time. If a registration update request is not received prior to the expiration time, the EES 421 shall treat the EAS 422 as implicitly de-registered.

Similarly, the EAS 423 and/or EAS 424 may perform the registration procedure described in FIG. 6 to register the EAS profile to the EES 421.

Figure 7:
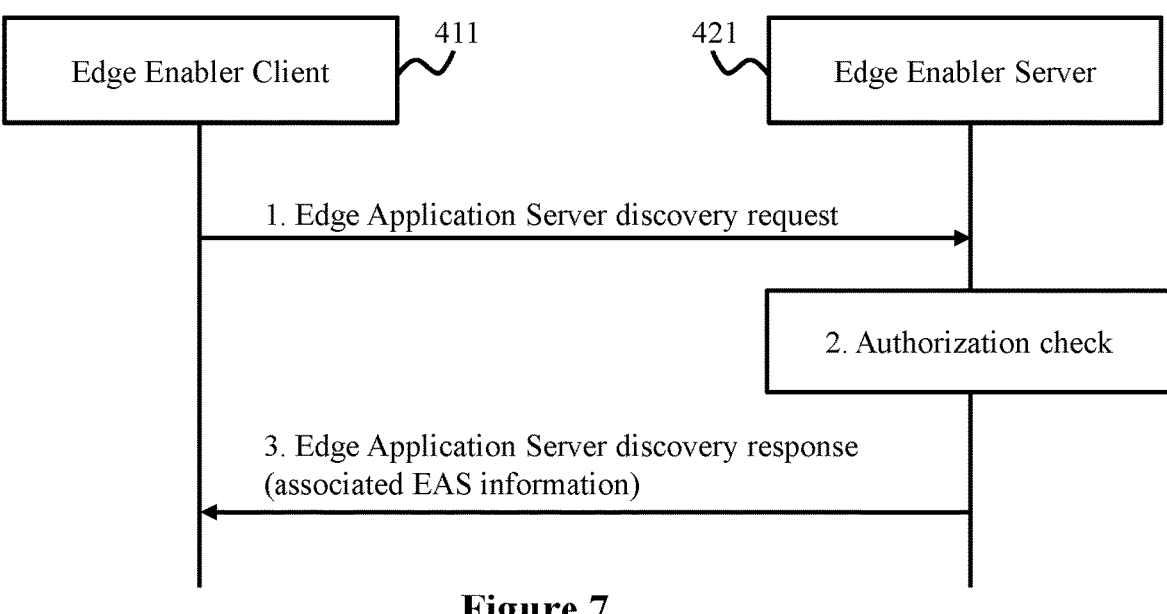
FIG. 7 is a schematic signaling chart showing the messages in the vertical EAS discovery request-response in EDGE deployment.

FIG. 7 is a schematic signaling chart showing the messages in the vertical EAS discovery request-response in EDGE deployment.

In an embodiment, the following pre-conditions are satisfied before performing the vertical EAS discovery.

(1). The EEC 411 has received information (e.g. URI, IP address) related to the EES 421;

(2). The EEC 411 has received appropriate security credentials authorizing it to communicate with the EES 421; and (3). The EES 421 is configured with ECSP's policy for EAS discovery.

In an embodiment, the signaling chart in FIG. 7 may include the following messages or steps:

Step 1. The EEC 411 sends an EAS discovery request to the EES 421. The EAS discovery request includes the requestor identifier e.g., EEC ID along with the security credentials and may include EAS discovery filters to retrieve information about particular EAS(s) or a category of EASs, e.g. gaming applications.

Step 2. Upon receiving the request from the EEC 411, the EES 421 checks if the EEC 411 is authorized to discover the requested EAS(s). The authorization check may apply to an individual EAS, a category of EASs or to the EDN, i.e. to all the EASs. The EES 421 may utilize the capabilities (e.g. UE location) of the 3GPP core network 403 as specified in clause 8.9.3. If EAS discovery filters are provided by the EEC 411, the EES 421 identifies the EAS(s) 422, 423, 424 based on the provided EAS discovery filters and the UE location. When EAS discovery filters are not provided, then:

if available, the EES 421 identifies the EAS(s) 422, 423, 424 based on the UE-specific service information at the EES 421 and the UE location;

EES 421 identifies the EAS(s) 422, 423, 424 by applying the ECSP policy (e.g. based only on the UE location);

If the EES 421 is unable to determine the EAS information using the inputs in the EAS discovery request, UE-specific service information at the EES 421 or the ECSP policy, the EES 421 shall reject the service provisioning request and respond with an appropriate failure cause.

If the UE 401 is located outside the Geographical or Topological Service Area of an EAS 422, 423, 424, then the EES 421 shall not include this 422, 423, 424 in the discovery response.

Step 3. If the processing of the request was successful, the EES 421 sends an EAS discovery response to the EEC 411, which includes information about the discovered EASs 422,

423, 424. For discovered EASs 422, 423, 424, this includes endpoint information. Depending on the EAS discovery filters received in the EAS discovery request, the response may include additional information regarding matched capabilities, e.g. service permissions levels, Application Client locations(s) that the EASs can support, Key Performance Indicators, etc.

In an embodiment, the response may also include the associated EAS information. For example, the information regarding the EAS profile in the above table 1 or table 2 may be included in the response. As a result, the UE 401 may discover the association between the EASs 422, 423, 424, which may be used for selecting the EASs 422, 423, 424 in a joint consideration.

Upon receiving the EAS discovery response, the EEC 411 uses the endpoint information for routing of the outgoing application data traffic to EAS(s), as needed, and may provide necessary notifications to the Application Client(s). The EEC may cache the EAS information (e.g. EAS endpoint) for subsequent use and avoid the need to repeat step 1. If the Lifetime IE is included in the response, the EEC 411 may cache the EAS information only for the duration specified by the Lifetime IE.

Figure 8:
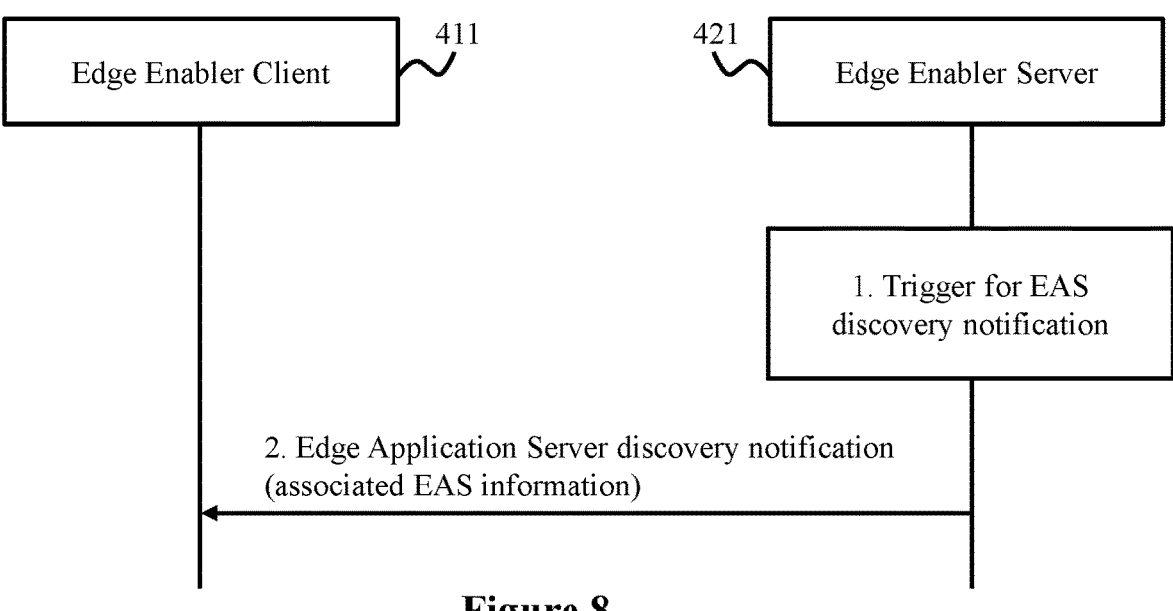
FIG. 8 is a schematic signaling chart showing the messages in the vertical EAS discovery notification in EDGE deployment.

FIG. 8 is a schematic signaling chart showing the messages in the vertical EAS discovery notification in EDGE deployment.

In an embodiment, the following pre-conditions are satisfied before performing the vertical EAS discovery.

(1). The EEC 411 has subscribed with the EES 421 for the EAS discovery information.

In an embodiment, the signaling chart in FIG. 8 may include the following messages or steps:

Step 1. An event occurs at the EES 421 that satisfies trigger conditions for providing EAS discovery information of a subscribed EEC 411. If UE's location information is not available, the EES 421 may obtain the UE location by utilizing the capabilities of the 3GPP core network 403 as specified in clause 8.9.2. If EAS discovery filters were provided by the EEC 411 during subscription creation, the EES 421 identifies the EAS(s) 422, 423, 424 based on the provided EAS discovery filters and the UE location. If EAS discovery filters were not provided, then:

if available, the EES 421 identifies the EAS(s) 422, 423, 424 based on the UE-specific service information at the EES 421 and the UE location;

EES 421 identifies the EAS(s) 422, 423, 424 by applying the ECSP policy (e.g. based only on the UE location);

If the UE 401 is located outside the Geographical or Topological Service Area of an Edge Application Server, then the EES 421 shall not include this EAS in the EAS discovery notification.

Step 2. The EES 421 sends an EAS discovery notification to the EEC 411 with the EAS information determined in step 1.

In an embodiment, the notification may also include the associated EAS information. For example, the information regarding the EAS profile in the above table 1 or table 2 may be included in the response. As a result, the UE may discover the association between the EASs 422, 423, 424, which may be used for selecting the EASs 422, 423, 424 in a joint consideration.

Figure 9:
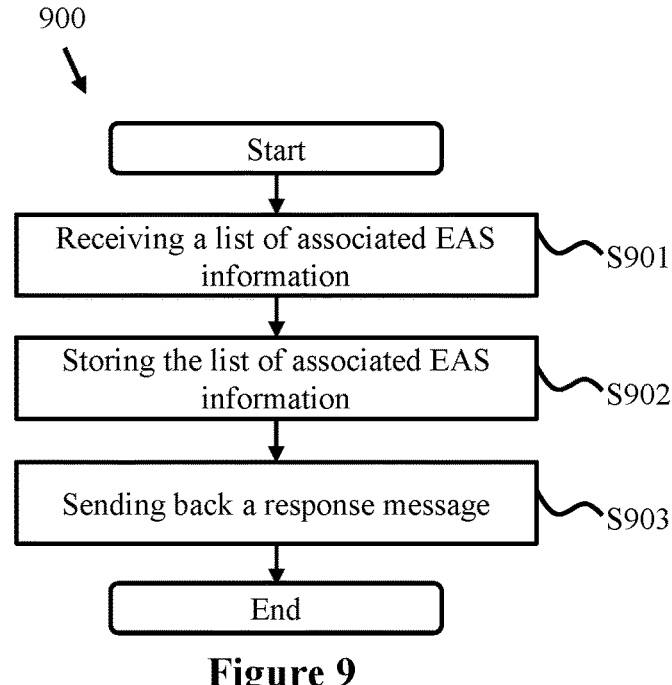
FIG. 9 is a schematic flow chart showing an example EAS registration method performed by the first network function, according to the embodiments herein.

FIG. 9 is a schematic flow chart showing an example EAS registration method 900 performed by the first network function, according to the embodiments herein. In an embodiment, the flow chart in FIG. 9 may be implemented in the above mentioned EES (such as the EES 421).

The method 900 may begin with step S901, in which the first network function may receive, from a second network function (such as the EAS 422) implementing EAS in the EDN, a registration request message comprising information indicating a first list of associated EAS information.

In an embodiment, the information indicating the first list of associated EAS information may be included in the EAS profile of the second network function. The EAS profile of the second network function may further include information indicating the EAS ID and information indicating the EAS endpoint of the second network function.

In an embodiment, the first list of associated EAS information may comprises at least one first entry for at least one third network function (such as the EAS 423) implementing EAS in the EDN respectively. Each first entry may indicate EAS profile of the respective third network function. The EAS profile of the respective third network function may include the EAS ID of the respective third network function and the relationship between the second network function and the respective third network function.

For example, the EAS 422 may transmit its EAS profile including the first list of associated EAS information (which may indicate the association of the EAS 422 with other EAS 423 and/or 424) to the EES 421.

For another example, the EAS 423 may transmit its EAS profile including the first list of associated EAS information (which may indicate the association of the EAS 423 with other EAS 424) to the EES 421.

In an embodiment, the relationship may indicate that the third network function is the parent, child, or sibling of the second network function, as may be seen from FIG. 4 or 5.

In an embodiment, each of the at least one first entry of the first list of associated EAS information may further indicate endpoint information of the respective third network function.

In an embodiment, the first entry for the third network function further comprises information indicating a second list of associated EAS information. The second list of associated EAS information may further comprise at least one second entry for at least one fourth network function (such as the EAS 424) implementing EAS in the EDN respectively. Each second entry may indicate EAS profile of the respective fourth network function. The EAS profile of the respective fourth network function may include the EAS ID of the respective fourth network function and the relationship between the third network function and the respective fourth network function.

For example, in an embedded registration of the EASs 422, 423, 424 (the EAS 424 is registered on the EAS 423, and the EAS 423 is registered on the EAS 422), the EAS 422 may transmit its EAS profile including the first list of associated EAS information (which may indicate the association of the EAS 422 with other EAS 423 and/or 424, by indicating the second list of associated EAS information for the association between the EAS 423 and 424) to the EES 421.

In an embodiment, the relationship may indicate that the fourth network function is the parent, child, or sibling of the third network function, as may be seen from FIG. 4 or 5.

In an embodiment, each of the at least one second entry of the second list of associated EAS information may further indicate endpoint information of the respective fourth network function.

In an embodiment, at least two of the second network function, the third network function, and the fourth network function are configured to jointly provide service for a vertical application. Then, at UE side, the UE may select at least two of associated servers based on the associated EAS information.

In an embodiment, the vertical application is any one of Factories of the Future (FF), Vehicle to Everything (V2X), Unmanned Aerial System (UAS), and Smart Grid.

In an embodiment, the second network function is implemented as Service Enabler Architecture Layer (SEAL) server 422 for the vertical application, and the third network function is implemented as Vertical Application Layer (VAL) server 423, 424. There may be administrative or management relationship between the SEAL server 422 and the VAL server 423, 424. For example, the SEAL server 422 may manage at least a part of the procedure of the VAL server 423, 424. For example, VAL server 423, 424 is registered on SEAL server 422 (i.e., on boarding configuration).

In an embodiment, the SEAL server 422 may include a SEAL Identity Management (IM) server. The SEAL IM server may provide Token Validation service to the VAL server 423, 424 for validating the token which was allocated by the SEAL IM server.

In an embodiment, the token may be for example an access token and/or an ID token.

In an embodiment, the VAL server is an FF Application Specific (FFAS) server 424 or an FF Application Enabler (FAE) server 423.

In an embodiment, the second network function is implemented as FF Application Enabler (FAE) server 423, and the third network function is implemented as FF Application Specific (FFAS) server 424.

Then, the method 900 may proceed to step S902, in which the first network function may store the information indicating the first list of associated EAS information.

In an embodiment, the first network function may store the information indicating other list(s) of associated EAS information. For example, the network function may store the information indicating the second list of associated EAS information.

In an embodiment, the first network function may store all the information received from the EAS. For example, the first network function may store all of the list(s) of associated EAS information received from the EAS.

Then, the method 900 may proceed to step S903, in which the first network function may transmit, to the second network function implementing EAS, a registration response message.

The above steps are only examples, and the first network function may perform any actions described with respect to FIGS. 6-8, to manage the associated EAS information for providing a consolidated view for the UE to select application servers that are deployed in edge.

Figure 10:
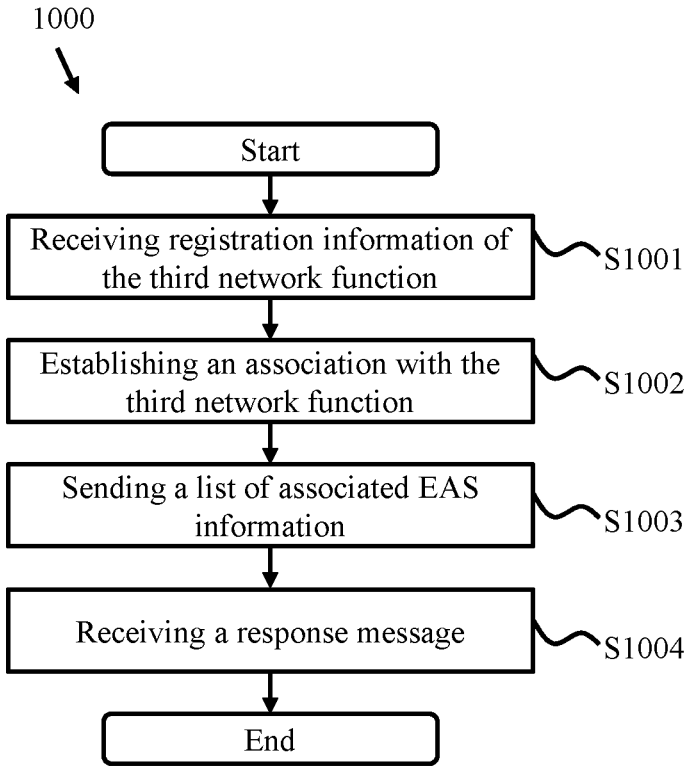
FIG. 10 is a schematic flow chart showing an example EAS registration method performed by the second network function, according to the embodiments herein.

FIG. 10 is a schematic flow chart showing an example EAS registration method 1000 performed by the second network function (such as the EAS 422, 423, 424), according to the embodiments herein. In an embodiment, the flow chart in FIG. 10 may be implemented in the above mentioned EASs 422, 423, 424.

The method 1000 may begin with step S1001, in which the second network function (such as the EAS 422) may receive, from the third network function (such as the EAS 423 or 424), a registration request, for registering the third network function in the second network function.

In an embodiment, the registration request may include information indicating at least one of the following: EAS ID of the third network function, the endpoint of the third network function, or relationship between the third network function and the third network function.

In an embodiment, the registration request may include information indicating the EAS profile of the third network function, which may further including information regarding an associated fourth network function.

Then, the method 1000 may proceed to step S1002, in which the second network function may store the above information received from the third network function as registration information of the third network function. For example, the second network function may store the registration information in a list of associated EAS information within the EAS profile of the second network function. In doing this, the association may be established between the second network function and the third network function (and further network function).

Then, the method 1000 may proceed to step S1003, in which the second network function may transmit, to a first network function (such as the EES 421) implementing EES in the EDN, a registration request message comprising information indicating a first list of associated EAS information.

In an embodiment, the information indicating the first list of associated EAS information may be included in the EAS profile of the second network function. The EAS profile of the second network function may further include information indicating the EAS ID and information indicating the EAS endpoint of the second network function.

In an embodiment, the first list of associated EAS information may comprises at least one first entry for at least one third network function implementing EAS in the EDN respectively. Each first entry may indicate EAS profile of the respective third network function. The EAS profile of the respective third network function may include the EAS ID of the respective third network function and the relationship between the second network function and the respective third network function.

In an embodiment, the relationship may indicate that the third network function is the parent, child, or sibling of the second network function, as may be seen from FIG. 4 or 5.

In an embodiment, each of the at least one first entry of the first list of associated EAS information may further indicate endpoint information of the respective third network function.

In an embodiment, the first entry for the third network function further comprises information indicating a second list of associated EAS information. The second list of associated EAS information may further comprise at least one second entry for at least one fourth network function implementing EAS in the EDN respectively. Each second entry may indicate EAS profile of the respective fourth network function. The EAS profile of the respective fourth network function may include the EAS ID of the respective fourth network function and the relationship between the third network function and the respective fourth network function (such as the EAS 424).

In an embodiment, the relationship may indicate that the fourth network function is the parent, child, or sibling of the third network function, as may be seen from FIG. 4 or 5.

In an embodiment, each of the at least one second entry of the second list of associated EAS information may further indicate endpoint information of the respective fourth network function.

In an embodiment, at least two of the second network function, the third network function, and the fourth network function are configured to jointly provide service for a vertical application. Then, at UE side, the UE may select at least two of associated servers based on the associated EAS information.

In an embodiment, the vertical application is any one of Factories of the Future (FF), Vehicle to Everything (V2X), Unmanned Aerial System (UAS), and Smart Grid.

In an embodiment, the second network function (such as the EAS 422) is implemented as Service Enabler Architecture Layer (SEAL) server for the vertical application, and the third network function is implemented as Vertical Application Layer (VAL) server (such as the EAS 423, 424). There may be administrative or management relationship between the SEAL server 422 and the VAL server 423, 424. For example, the SEAL server 422 may manage at least a part of the procedure of the VAL server 423, 424. For example, the VAL server 423, 424 is registered on the SEAL server 422 (i.e., on boarding configuration).

In an embodiment, the SEAL server 422 may include a SEAL Identity Management (IM) server. The SEAL IM server may provide Token Validation service to the VAL server 423, 424 for validating the token which was allocated by the SEAL IM server.

In an embodiment, the token may be for example an access token and/or an ID token.

In an embodiment, the VAL server 423, 424 is an FF Application Specific (FFAS) server 424 or an FF Application Enabler (FAE) server 423.

In an embodiment, the second network function is implemented as FF Application Enabler (FAE) server 423, and the third network function is implemented as FF Application Specific (FFAS) server 424.

Then, the method 1000 may proceed to step S1004, in which the second network function may receive, from the first network function implementing EES, a registration response message.

The above steps are only examples, and the second network function may perform any actions described with respect to FIGS. 6-8, to manage the associated EAS information for providing a consolidated view for the UE to select application servers that are deployed in edge.

Figure 11:
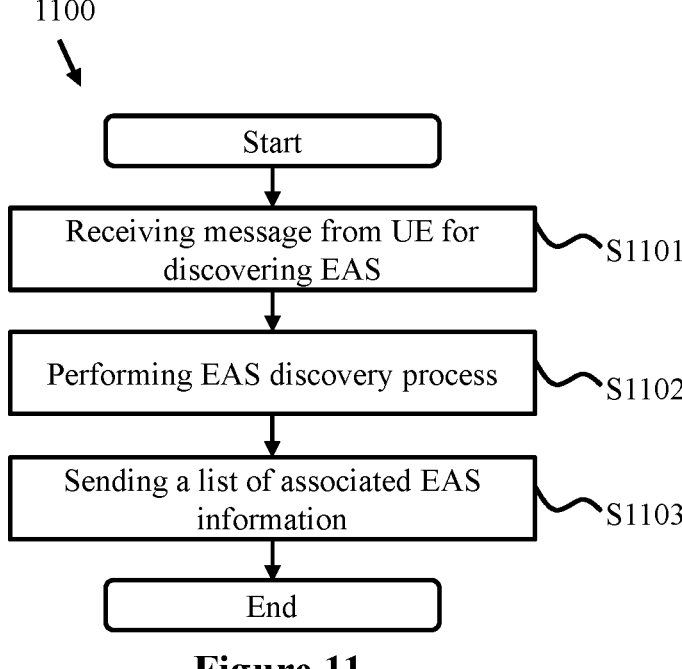
FIG. 11 is a schematic flow chart showing an example EAS discovery method performed by the first network function, according to the embodiments herein.

FIG. 11 is a schematic flow chart showing an example EAS discovery method 1100 performed by the first network function, according to the embodiments herein. In an embodiment, the flow chart in FIG. 11 may be implemented in the above mentioned EES (such as EES 421).

The method 1100 may begin with step S1101, in which the first network function may receive receiving, from a functional component of a User Equipment (UE) 401, a first message for discovering at least one second network function implementing Edge Application Server (EAS) in the EDN 402.

In an embodiment, the first message may be a discovery request message for discovering the EAS server.

In an embodiment, the first message may be a discovery subscription message for subscribing the discovery of the EAS server.

In an embodiment, the first message further comprises an indicator explicitly indicating EAS association. For example, the EEC 411 may indicate explicitly for the EAS association in the EAS discovery request or EAS discovery subscription request so that only the EAS(s) having any EAS association will be discovered.

Then, the method 1100 may proceed to step S1102, in which the first network function may perform an EAS discovery process to discover the EAS. In an embodiment, the EAS discovery process is performed based on the indicator explicitly indicating EAS association. As a result, the first network function may discover at least one EAS. There may be association among the at least one EAS. For example, the first network function may discover at least a first list of associated EAS information.

In an embodiment, the information indicating the first list of associated EAS information may be included in the EAS profile of the second network function. The EAS profile of the second network function (such as EAS 422) may further include information indicating the EAS ID and information indicating the EAS endpoint of the second network function.

In an embodiment, the first list of associated EAS information may comprises at least one first entry for at least one third network function (such as EAS 423) implementing EAS in the EDN respectively. Each first entry may indicate EAS profile of the respective third network function. The EAS profile of the respective third network function may include the EAS ID of the respective third network function and the relationship between the second network function and the respective third network function.

In an embodiment, the relationship may indicate that the third network function is the parent, child, or sibling of the second network function, as may be seen from FIG. 4 or 5.

In an embodiment, each of the at least one first entry of the first list of associated EAS information may further indicate endpoint information of the respective third network function.

In an embodiment, the first entry for the third network function further comprises information indicating a second list of associated EAS information. The second list of associated EAS information may further comprise at least one second entry for at least one fourth network function (such as EAS 424) implementing EAS in the EDN respectively. Each second entry may indicate EAS profile of the respective fourth network function. The EAS profile of the respective fourth network function may include the EAS ID of the respective fourth network function and the relationship between the third network function and the respective fourth network function.

In an embodiment, the relationship may indicate that the fourth network function is the parent, child, or sibling of the third network function, as may be seen from FIG. 4 or 5.

In an embodiment, each of the at least one second entry of the second list of associated EAS information may further indicate endpoint information of the respective fourth network function.

In an embodiment, at least two of the second network function, the third network function, and the fourth network function are configured to jointly provide service for a vertical application. Then, at UE side, the UE may select at least two of associated servers based on the associated EAS information.

In an embodiment, the vertical application is any one of Factories of the Future (FF), Vehicle to Everything (V2X), Unmanned Aerial System (UAS), and Smart Grid.

In an embodiment, the second network function is implemented as Service Enabler Architecture Layer (SEAL) server 422 for the vertical application, and the third network function is implemented as Vertical Application Layer (VAL) server 423, 424. There may be administrative or management relationship between the SEAL server 422 and the VAL server 423, 424. For example, the SEAL server 422 may manage at least a part of the procedure of the VAL server 423, 424. For example, the VAL server 423, 424 is registered on the SEAL server 422 (i.e., on boarding configuration).

In an embodiment, the SEAL server 422 may include a SEAL Identity Management (IM) server. The SEAL IM server may provide Token Validation service to the VAL server 423, 424 for validating the token which was allocated by the SEAL IM server.

In an embodiment, the token may be for example an access token and/or an ID token.

In an embodiment, the VAL server is an FF Application Specific (FFAS) server 424 or an FF Application Enabler (FAE) server 423.

In an embodiment, the second network function is implemented as FF Application Enabler (FAE) server 423, and the third network function is implemented as FF Application Specific (FFAS) server 424.

Then, the method 1100 may proceed to step S1103, in which the first network function may transmit, to the functional component of the UE, a second message including information indicating a first list of associated EAS information.

In an embodiment, the second message is a discovery response message in response to the first message (request message).

In an embodiment, the second message is a discovery notification message in response to the first message (subscription message).

In an embodiment, the first functional component is implemented as Edge Enabler Client (EEC) 411, and wherein the first and/or second messages are sent over the EDGE-1 reference point.

The above steps are only examples, and the second network function may perform any actions described with respect to FIGS. 6-8, to manage the associated EAS information for providing a consolidated view for the UE to select application servers that are deployed in edge.

Figure 12:
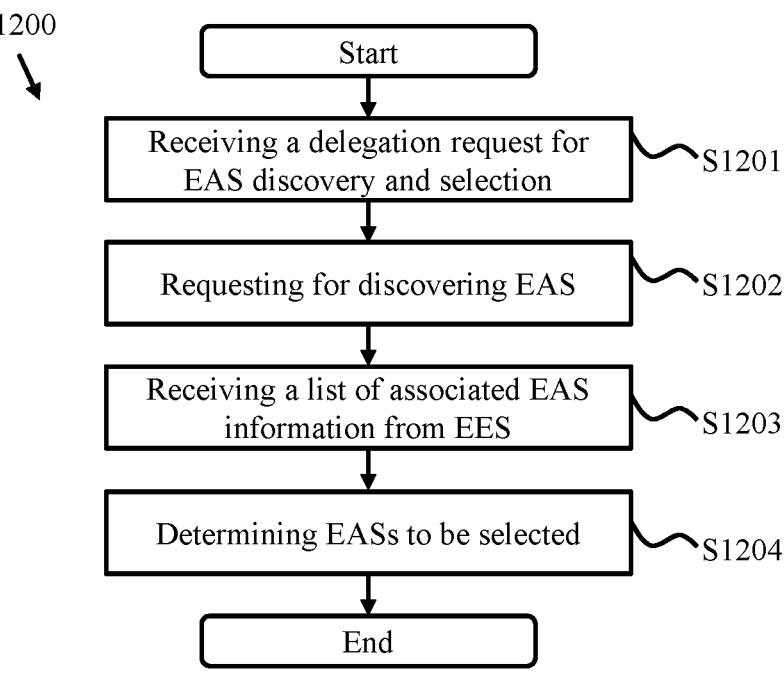
FIG. 12 is a schematic flow chart showing an example EAS discovery method performed by a first functional component in UE, according to the embodiments herein.

FIG. 12 is a schematic flow chart showing an example EAS discovery method 1200 performed by a first functional component in UE, according to the embodiments herein. In an embodiment, the flow chart in FIG. 12 may be implemented in the above mentioned EEC (such as EEC 411).

The method 1200 may begin with step S1201, in which the first functional component may receive, from a second functional component (such as one of application client 412, 413 or 414) in the UE, a first delegation request for EAS discovery and selection for the second functional component. Furthermore, the first functional component may receive, from a third functional component (such as another of application client 412, 413 or 414) in the UE, a second delegation request for EAS discovery and selection for the third functional component.

In an embodiment, the second functional component is implemented as Service Enabler Architecture Layer (SEAL) client 412 for the vertical application. Furthermore, the third functional component is implemented as Vertical Application Layer (VAL) client 413, 414.

In an embodiment, the VAL server is an Application Specific client 414 or an Application Enabler client 413.

In an embodiment, the second functional component is implemented as Application Enabler client 413, and the third functional component is implemented as Application Specific client 414.

Then, the method 1200 may proceed to step S1202, in which the first functional component may transmit, to a first network function implementing Edge Enabler Server (EES) in an Edge Data Network (EDN), a first message for discovering at least one second network function implementing Edge Application Server (EAS) in the EDN.

In an embodiment, the first message may be a discovery request message for discovering the EAS server.

In an embodiment, the first message may be a discovery subscription message for subscribing the discovery of the EAS server.

In an embodiment, the first message further comprises an indicator explicitly indicating EAS association. For example, the EEC 411 may indicate explicitly for the EAS association in the EAS discovery request or EAS discovery subscription request so that only the EAS(s) having any EAS association will be discovered.

In an embodiment, after receiving the first message from the first functional component in the UE, the first network function (such as EES 421) may perform an EAS discovery process to discover the EAS 422, 423, 424. In an embodiment, the EAS discovery process is performed based on the indicator explicitly indicating EAS association. As a result, the first network function may discover at least one EAS. There may be association among the at least one EAS. For example, the first network function may discover at least a first list of associated EAS information.

Then, the method 1200 may proceed to step S1203, in which the first functional component may receive, from the first network function, a second message including information indicating the first list of associated EAS information.

In an embodiment, the second message is a discovery response message in response to the first message (request message).

In an embodiment, the second message is a discovery notification message in response to the first message (subscription message).

In an embodiment, the first and/or second messages are sent over the EDGE-1 reference point.

In an embodiment, the information indicating the first list of associated EAS information may be included in the EAS profile of the second network function (such as EAS 422). The EAS profile of the second network function may further include information indicating the EAS ID and information indicating the EAS endpoint of the second network function.

In an embodiment, the first list of associated EAS information may comprises at least one first entry for at least one third network function (such as EAS 423) implementing EAS in the EDN respectively. Each first entry may indicate EAS profile of the respective third network function. The EAS profile of the respective third network function may include the EAS ID of the respective third network function and the relationship between the second network function and the respective third network function.

In an embodiment, the relationship may indicate that the third network function is the parent, child, or sibling of the second network function, as may be seen from FIG. 4 or 5.

In an embodiment, each of the at least one first entry of the first list of associated EAS information may further indicate endpoint information of the respective third network function.

In an embodiment, the first entry for the third network function further comprises information indicating a second list of associated EAS information. The second list of associated EAS information may further comprise at least one second entry for at least one fourth network function (such as EAS 424) implementing EAS in the EDN respectively. Each second entry may indicate EAS profile of the respective fourth network function. The EAS profile of the respective fourth network function may include the EAS ID of the respective fourth network function and the relationship between the third network function and the respective fourth network function.

In an embodiment, the relationship may indicate that the fourth network function is the parent, child, or sibling of the third network function, as may be seen from FIG. 4 or 5.

In an embodiment, each of the at least one second entry of the second list of associated EAS information may further indicate endpoint information of the respective fourth network function.

In an embodiment, at least two of the second network function, the third network function, and the fourth network function are configured to jointly provide service for a vertical application. Then, at UE side, the UE may select at least two of associated servers based on the associated EAS information.

In an embodiment, the vertical application is any one of Factories of the Future (FF), Vehicle to Everything (V2X), Unmanned Aerial System (UAS), and Smart Grid.

In an embodiment, the second network function is implemented as Service Enabler Architecture Layer (SEAL) server 422 for the vertical application, and the third network function is implemented as Vertical Application Layer (VAL) server 423, 424. There may be administrative or management relationship between the SEAL server 422 and the VAL server 423, 424. For example, the SEAL server 422 may manage at least a part of the procedure of the VAL server 423, 424. For example, the VAL server 423, 424 is registered on SEAL server 422 (i.e., on boarding configuration).

In an embodiment, the SEAL server 422 may include a SEAL Identity Management (IM) server. The SEAL IM server may provide Token Validation service to the VAL server for validating the token which was allocated by the SEAL IM server.

In an embodiment, the token may be for example an access token and/or an ID token.

In an embodiment, the VAL server is an FF Application Specific (FFAS) server 424 or an FF Application Enabler (FAE) server 423.

In an embodiment, the second network function is implemented as FF Application Enabler (FAE) server 423, and the third network function is implemented as FF Application Specific (FFAS) server 424.

In an embodiment, the information indicating the first list of associated EAS information is included in a set of EAS profiles of a first set of network functions implementing EAS in the EDN. For example, the first network function may discover a set of EAS (i.e., more than one EAS or at least one EAS), and may provide the information (such as EAS profile) of discovered set of EAS.

Then, the method 1200 may proceed to step S1204, in which the first functional component may determine the EAS for selecting. For example, the first functional component (for example EEC) may determine, from a set of EAS profiles, the first set of network functions implementing EAS in the EDN. Furthermore, the first functional component may determine, from the first list of associated EAS information, a second set of network function implementing EAS in the EDN. Note that, depending on the received the associated EAS information, the EEC may use various approaches to determine the EAS for providing vertical application service.

In an embodiment, at least two network functions for selecting are associated. For example, at least two network functions from the first and second set of network functions have the administrative or management relationship. For example, one of the two network functions is registered on the other of the two network functions (i.e., on boarding configuration).

In an embodiment, the first functional component may narrow the network functions to be selected by the second functional component and the third functional component, in response to the delegation request. For example, the first functional component may provide several options (that is, providing several set of associated network functions) for the second functional component and the third functional component.

In an embodiment, the first functional component may select only one set of associated network functions for the second functional component and the third functional component. That is, the first functional component may determine the network function for the second functional component, and the network function for the third functional component, according to the delegation request.

In an embodiment, the first functional component may notify, to the second functional component and the third functional component respectively, the selected network functions for the second functional component and the third functional component.

Upon receiving the notification, the second functional component and the third functional component may perform a coordination to select the network functions, so that the selected network functions are associated. For example, the selected network functions have the administrative or management relationship. For example, one of the selected network functions is registered on the other of the selected network functions (i.e., on boarding configuration). On the other hand, the third functional component may send a delegation request to the second functional component, so that the second functional component may perform a selection on behalf of the third functional component.

Note that, the above step S1201 and steps S1202-S1203 may be perform in any manner, for example, performed in any sequence, performed at the same time, or performed separately.

The above steps are only examples, and the UE may perform any actions to manage the associated EAS information for selecting, in a consolidated view, application servers that are deployed in edge.

Figure 13:
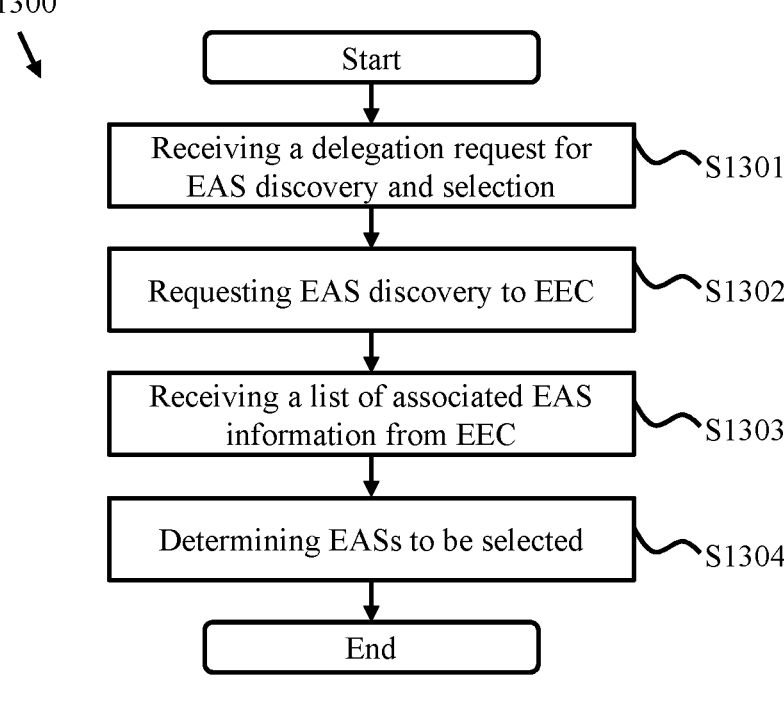
FIG. 13 is a schematic flow chart showing an example EAS discovery method performed by a second functional component in UE, according to the embodiments herein.

FIG. 13 is a schematic flow chart showing an example EAS discovery method 1300 performed by a second functional component in UE, according to the embodiments herein. In an embodiment, the flow chart in FIG. 13 may be implemented in an application client 412, 413 or 414 for vertical application.

The method 1300 may begin with step S1301, in which the second functional component (such as one of application client 412, 413 or 414) may receive, from a third functional component (such as another of application client 412, 413 or 414) in the UE, a delegation request for EAS discovery and selection for the third functional component.

In an embodiment, the second functional component is implemented as Service Enabler Architecture Layer (SEAL) client 412 for the vertical application. Furthermore, the third functional component is implemented as Vertical Application Layer (VAL) client 413, 414.

In an embodiment, the VAL server is an Application Specific client 414 or an Application Enabler client 413.

In an embodiment, the second functional component is implemented as Application Enabler client 413, and the third functional component is implemented as Application Specific client 414.

Then, the method 1300 may proceed to step S1302, in which the second functional component may initiate the EAS discovery process in any approach. For example, the second functional component may request the EAS discovery process to the first functional component over EDGE-5 reference point.

Then, after receiving the request from the second functional component, the first functional component (such as EEC 411) may further request the first functional component (such as EES 421) for EAS discovery process. Then, the first network function may perform an EAS discovery process to discover the EAS(s) (such as EAS 422, 423, 424). As a result, the first network function may discover at least one EAS. There may be association among the at least one EAS. For example, the first network function may discover at least a first list of associated EAS information. The discovery of EAS may further refer to the above steps with respect to FIG. 12.

Then, the method 1300 may proceed to step S1303, in which the second functional component may receive, from a first functional component in the UE, a message including information indicating a list of associated Edge Application Server (EAS) information. In an embodiment, the first functional component is implemented as Edge Enabler Client (EEC) 411. In an embodiment, the message is EAS discovery response message or EAS discovery notification message sent over the EDGE-5 reference point.

In an embodiment, the information indicating the first list of associated EAS information may be included in the EAS profile of the second network function. The EAS profile of the second network function may further include information indicating the EAS ID and information indicating the EAS endpoint of the second network function.

In an embodiment, the first list of associated EAS information may comprises at least one first entry for at least one third network function implementing EAS in the EDN respectively. Each first entry may indicate EAS profile of the respective third network function. The EAS profile of the respective third network function may include the EAS ID of the respective third network function and the relationship between the second network function and the respective third network function.

In an embodiment, the relationship may indicate that the third network function is the parent, child, or sibling of the second network function, as may be seen from FIG. 4 or 5.

In an embodiment, each of the at least one first entry of the first list of associated EAS information may further indicate endpoint information of the respective third network function.

In an embodiment, the first entry for the third network function (such as EAS 423) further comprises information indicating a second list of associated EAS information. The second list of associated EAS information may further comprise at least one second entry for at least one fourth network function (such as EAS 424) implementing EAS in the EDN respectively. Each second entry may indicate EAS profile of the respective fourth network function. The EAS profile of the respective fourth network function may include the EAS ID of the respective fourth network function and the relationship between the third network function and the respective fourth network function.

In an embodiment, the relationship may indicate that the fourth network function is the parent, child, or sibling of the third network function, as may be seen from FIG. 4 or 5.

In an embodiment, each of the at least one second entry of the second list of associated EAS information may further indicate endpoint information of the respective fourth network function.

In an embodiment, at least two of the second network function, the third network function, and the fourth network function are configured to jointly provide service for a vertical application. Then, at UE side, the UE may select at least two of associated servers based on the associated EAS information.

In an embodiment, the vertical application is any one of Factories of the Future (FF), Vehicle to Everything (V2X), Unmanned Aerial System (UAS), and Smart Grid.

In an embodiment, the second network function is implemented as Service Enabler Architecture Layer (SEAL) server 422 for the vertical application, and the third network function is implemented as Vertical Application Layer (VAL) server 423, 424. There may be administrative or management relationship between the SEAL server 422 and the VAL server 423, 424. For example, the SEAL server 422 may manage at least a part of the procedure of the VAL server 423, 424. For example, VAL server 423, 424 is registered on SEAL server 422 (i.e., on boarding configuration).

In an embodiment, the SEAL server 422 may include a SEAL Identity Management (IM) server. The SEAL IM server may provide Token Validation service to the VAL server 423, 424 for validating the token which was allocated by the SEAL IM server.

In an embodiment, the token may be for example an access token and/or an ID token.

In an embodiment, the VAL server is an FF Application Specific (FFAS) server 424 or an FF Application Enabler (FAE) server 423.

In an embodiment, the second network function is implemented as FF Application Enabler (FAE) server 423, and the third network function is implemented as FF Application Specific (FFAS) server 424.

In an embodiment, the information indicating the first list of associated EAS information is included in a set of EAS profiles of a first set of network functions implementing EAS in the EDN. For example, the first network function may discover a set of EAS (i.e., more than one EAS or at least one EAS), and may provide the information (such as EAS profile) of discovered set of EAS.

Then, the method 1300 may proceed to step S1304, in which the second functional component may determine the EAS for selecting. For example, the second functional component may determine, from a set of EAS profiles, the first set of network functions implementing EAS in the EDN. Furthermore, the second functional component may determine, from the first list of associated EAS information, a second set of network function implementing EAS in the EDN. Note that, depending on the received the associated EAS information, the second functional component may use various approaches to determine the EAS for providing vertical application service.

In an embodiment, at least two network functions for selecting are associated. For example, at least two network functions from the first and second set of network functions have the administrative or management relationship. For example, one of the two network functions is registered on the other of the two network functions (i.e., on boarding configuration).

In an embodiment, the second functional component may narrow the network functions to be selected by the second functional component and the third functional component, in response to the delegation request. For example, the second functional component may provide several options (that is, providing several set of associated network functions) for the third functional component.

In an embodiment, the second functional component may select only one set of associated network functions for the second functional component and the third functional component. That is, the second functional component may determine the network function for the second functional component, and the network function for the third functional component, according to the delegation request.

In an embodiment, the second functional component may notify, to the third functional component, the selected network functions for the third functional component.

In an embodiment, the second functional component and the third functional component may perform a coordination to select the network functions, so that the selected network functions are associated. For example, the selected network functions have the administrative or management relationship. For example, one of the selected network functions is registered on the other of the selected network functions (i.e., on boarding configuration).

Note that, the above step S1301 and steps S1302-S1303 may be perform in any manner, for example, performed in any sequence, performed at the same time, or performed separately.

Further note that, the above step S1301 (i.e., the delegation of EAS discovery and selection) may be a mandatory step, so that the subsequent EAS selection step S1304 can happen in the second functional component; otherwise step S1304 will happen in the third functional component. Furthermore, the above step S1301 also may be an optional step, that is there is no delegation between the second functional component and the third functional component, then the second functional component and the third functional component need to coordinate the EAS selection if any associated EAS information is received.

The above steps are only examples, and the UE may perform any actions to manage the associated EAS information for selecting, in a consolidated view, application servers that are deployed in edge.

Figure 14:
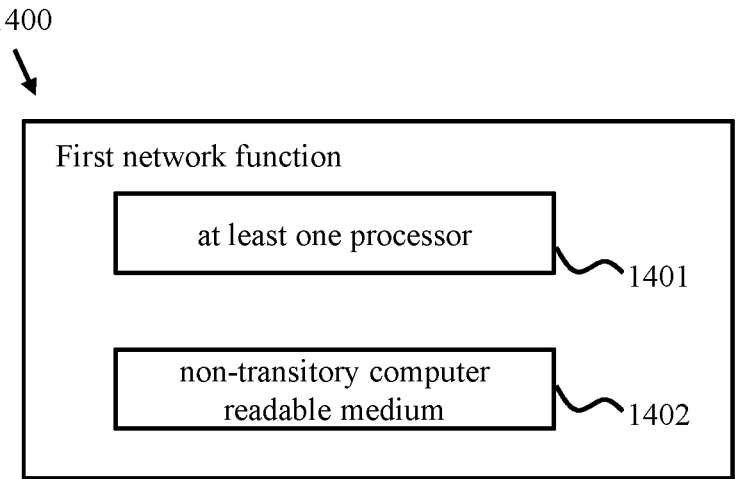
FIG. 14 is a schematic block diagram showing an example first network function, according to the embodiments herein.

FIG. 14 is a schematic block diagram showing an example first network function (such as EES 421), according to the embodiments herein;

In an embodiment, the first network function 1400 may include at least one processor 1401; and a non-transitory computer readable medium 1402 coupled to the at least one processor 1401. The non-transitory computer readable medium 1402 contains instructions executable by the at least one processor 1401, whereby the at least one processor 1401 is configured to perform the steps in the example method 900 as shown in the schematic flow chart of FIG. 9 and the example method 1100 as shown in the schematic flow chart of FIG. 11; the details thereof are omitted here.

Note that, the first network function 1400 may be implemented as hardware, software, firmware and any combination thereof. For example, the first network function 1400 may include a plurality of units, circuities, modules or the like, each of which may be used to perform one or more steps of the example methods 900/1100 or one or more steps shown in FIGS. 6-8 related to the EES.

It should be understood that, a network function may be implemented either as a network element on a dedicated hardware, as a software instance running on a dedicated hardware, or as a virtualized function instantiated on an appropriate platform, e.g. on a cloud infrastructure.

Figure 15:
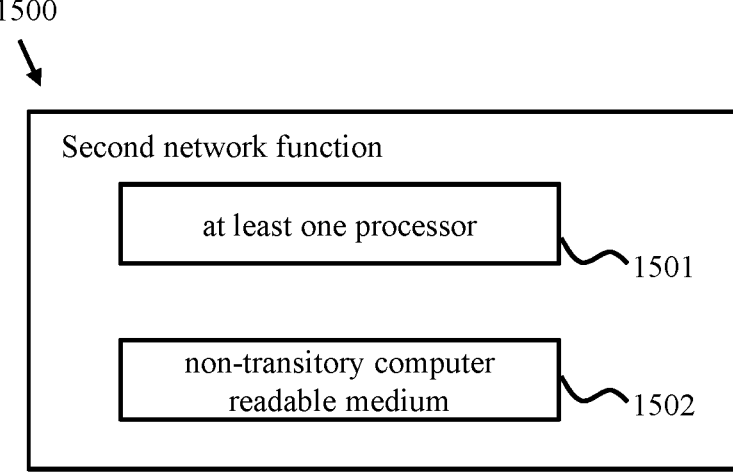
FIG. 15 is a schematic block diagram showing an example second network function, according to the embodiments herein.

FIG. 15 is a schematic block diagram showing an example second network function (such as EAS 422, 423, 424), according to the embodiments herein.

In an embodiment, the second network function 1500 may include at least one processor 1501; and a non-transitory computer readable medium 1502 coupled to the at least one processor 1501. The non-transitory computer readable medium 1502 contains instructions executable by the at least one processor 1501, whereby the at least one processor 1501 is configured to perform the steps in the example method 1000 as shown in the schematic flow chart of FIG. 10; the details thereof are omitted here.

Note that, the second network function 1500 may be implemented as hardware, software, firmware and any combination thereof. For example, the second network function 1500 may include a plurality of units, circuities, modules or the like, each of which may be used to perform one or more steps of the example method 1000 or one or more steps shown in FIGS. 6-8 related to the EAS.

Note that, similarly to the second network function, the above mentioned third network function and/or fourth network function also may implemented as EAS in the EDN. Thus, the above mentioned third network function and/or fourth network function also may include same or similar structure and/or function as the second network function. The details of the third network function and/or the fourth network function are omitted here.

Figure 16:
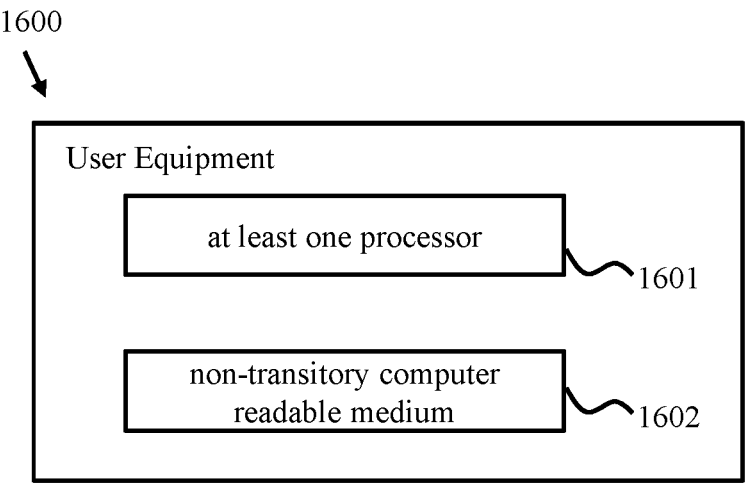
FIG. 16 is a schematic block diagram showing an example UE, according to the embodiments herein.

FIG. 16 is a schematic block diagram showing an example UE, according to the embodiments herein. In an embodiment, the UE 1600 may include a functional component(s) (such as the EEC 411, SEAL 412, enabler client 413, application specific client 414), as shown in FIGS. 4-5.

In an embodiment, the UE 1600 may include at least one processor 1601; and a non-transitory computer readable medium 1602 coupled to the at least one processor 1601. The non-transitory computer readable medium 1602 contains instructions executable by the at least one processor 1601, whereby the at least one processor 1601 is configured to perform the steps in the example method 1200 as shown in the schematic flow chart of FIG. 12 and/or the steps in the example method 1300 as shown in the schematic flow chart of FIG. 13; the details thereof are omitted here.

Note that, the UE 1600 may include hardware, software, firmware and any combination thereof. For example, the UE 1600 may include a plurality of units, circuities, modules or the like, each of which may be used to perform one or more steps of the example methods 1200/1300 or one or more steps shown in FIGS. 6-8 related to the UE.

Also, the functional component(s) in the UE (such as the EEC, SEAL, enabler client, application specific client) may be hardware, software, firmware and any combination thereof. For example, the functional component(s) may be implemented as a plurality of units, circuities, modules or the like, each of which may be used to perform one or more steps of the example methods 1200/1300 or one or more steps shown in FIGS. 6-8 related to the UE.

In some embodiments, the non-limiting term UE is used. UE 1600 described herein can be any type of wireless device capable, configured, arranged and/or operable to communicate wirelessly with network nodes and/or another wireless device, for example over radio signals. Communicating wirelessly may involve transmitting and/or receiving wireless signals using electromagnetic signals, radio waves, infrared signals, and/or other types of signals suitable for conveying information through air. In particular embodiments, UE 1600 may be configured to transmit and/or receive information without direct human interaction. For instance, a UE may be designed to transmit information to a network on a predetermined schedule, when triggered by an internal or external event, or in response to requests from the network.

Generally, UE may represent any device capable of, configured for, arranged for, and/or operable for wireless communication, for example radio communication devices.

Examples of UE include, but are not limited to, smart phones. Further examples include wireless cameras, wireless-enabled tablet computers, laptop-embedded equipment (LEE), laptop-mounted equipment (LME), USB dongles, and/or wireless customer-premises equipment (CPE). UE 900 may also be a radio communication device, target device, D2D UE, machine-type-communication (MTC) UE or UE capable of machine-to-machine (M2M) communication, low-cost and/or low-complexity UE, a sensor equipped with UE, Tablet, mobile terminals, an Internet of Things (IoT) device, or a Narrowband IoT (NB-IOT) device, or any other suitable devices.

As one specific example, a UE may be configured for communication in accordance with one or more communication standards promulgated by the 3rd Generation Partnership Project (3GPP), such as 3GPP's Global System for New Radio (NR), Mobile Communications (GSM), Universal Mobile Telecommunications System (UMTS), Long Term Evolution (LTE), and/or other suitable 2G, 3G, 4G or 5G standards or other suitable standards. As used herein, a "UE" may not necessarily have a "user" in the sense of a human user who owns and/or operates the relevant device. Instead, a UE may represent a device that is intended for sale to, or operation by, a human user but that may not initially be associated with a specific human user.

Figure 17:
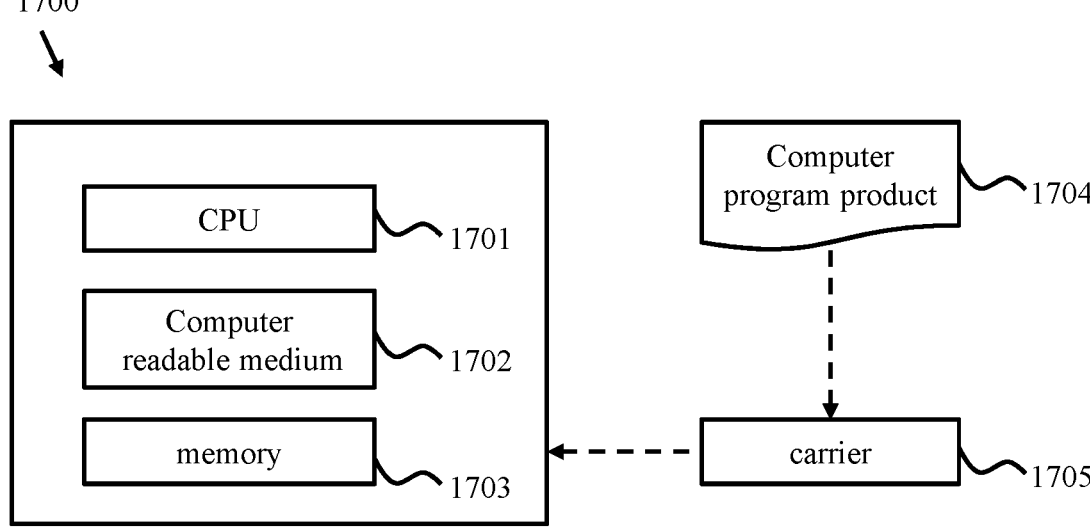
FIG. 17 is a schematic block diagram showing an example computer-implemented apparatus, according to the embodiments herein.

FIG. 17 is a schematic block diagram showing an example computer-implemented apparatus 1700, according to the embodiments herein. In an embodiment, the apparatus 1700 may be configured as the above mentioned apparatus, such as the first network function 1400, the second network function 1500, the third network function, the fourth network function, or the UE 1600.

In an embodiment, the apparatus 1700 may include but not limited to at least one processor such as Central Processing Unit (CPU) 1701, a computer-readable medium 1702, and a memory 1703. The memory 1703 may comprise a volatile (e.g. Random Access Memory, RAM) and/or non-volatile memory (e.g. a hard disk or flash memory). In an embodiment, the computer-readable medium 1702 may be configured to store a computer program and/or instructions, which, when executed by the processor 1701, causes the processor 1701 to carry out any of the above mentioned methods.

In an embodiment, the computer-readable medium 1702 (such as non-transitory computer readable medium) may be stored in the memory 1703. In another embodiment, the computer program may be stored in a remote location for example computer program product 1704 (also may be embodied as computer-readable medium), and accessible by the processor 1701 via for example carrier 1705.

The computer-readable medium 1702 and/or the computer program product 1704 may be distributed and/or stored on a removable computer-readable medium, e.g. diskette, CD (Compact Disk), DVD (Digital Video Disk), flash or similar removable memory media (e.g. compact flash, SD (secure digital), memory stick, mini SD card, MMC multimedia card, smart media), HD-DVD (High Definition DVD), or Blu-ray DVD, USB (Universal Serial Bus) based removable memory media, magnetic tape media, optical storage media, magneto-optical media, bubble memory, or distributed as a propagated signal via a network (e.g. Ethernet, ATM, ISDN, PSTN, X.25, Internet, Local Area Network (LAN), or similar networks capable of transporting data packets to the infrastructure node).

Example embodiments are described herein with reference to block diagrams and/or flowchart illustrations of computer-implemented methods, apparatus (systems and/or devices) and/or non-transitory computer program products. It is understood that a block of the block diagrams and/or flowchart illustrations, and combinations of blocks in the block diagrams and/or flowchart illustrations, may be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that may direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

ABBREVIATIONS

3GPP third Generation Partnership Project
5G 5th generation mobile networks
API Application Programming Interface
APP Application
EAS Edge Application Server
ECS Edge Configuration Server
ECSP Edge Computing Service Provider
EDN Edge Data Network
EEC Edge Enabler Client
EES Edge Enabler Server
FAE Factories of the Future Application Enabler
FF Factories of the Future
FFAPP Factories of the Future Application
QoS Quality of Service
SEAL Service Enabler Architecture Layer for Verticals
UAS Unmanned Aerial System
UE User Equipment
V2X Vehicle to Everything
VAL Vertical Application Layer.

What is claimed is:

1. A method performed by a second network function implementing Edge Application Server (EAS) in an Edge Data Network (EDN), comprising:

transmitting, to a first network function implementing Edge Enabler Server (EES) in the EDN, a registration request message comprising information indicating a first list of associated EAS information, wherein the first list of associated EAS information comprising at least one first entry for at least one third network function implementing EAS in the EDN respectively, each first entry indicating EAS profile of respective third network function, and wherein the EAS profile of the respective third network function includes an ID of the EAS (EAS ID) of the respective third network function and a relationship between the second network function and the respective third network function.

2. The method according to claim 1, wherein each first entry for the respective third network function further comprises information indicating a second list of associated EAS information, the second list of associated EAS information further comprises at least one second entry for at least one fourth network function implementing EAS in the EDN respectively, each second entry indicating EAS profile of respective fourth network function, and wherein the EAS profile of the respective fourth network function includes the EAS ID of the respective fourth network function and a relationship between the respective third network function and the respective fourth network function.

3. The method according to claim 2, wherein the relationship between the second network function and the respective third network function indicates that the respective third network function is a parent, child, or sibling of the second network function, or wherein the relationship between the respective third network function and the respective fourth network function indicates that the fourth network function is a parent, child, or sibling of the respective third network function.

4. The method according to claim 2, wherein each of the at least one first entry of the first list of associated EAS information further indicating endpoint information of the respective third network function, or wherein each of the at least one second entry of the second list of associated EAS information further indicating endpoint information of the respective fourth network function.

5. The method according to claim 1, wherein the information indicating the first list of associated EAS information is included in an EAS profile of the second network function, and wherein the EAS profile of the second network function further includes information indicating an ID of the EAS (EAS ID) and information indicating an EAS endpoint of the second network function.

6. The method according to claim 2, wherein at least two of the second network function, one third network function, and one fourth network function are configured to jointly provide service for a vertical application.

7. The method according to claim 6, wherein the vertical application is any one of Factories of the Future (FF), Vehicle to Everything (V2X), Unmanned Aerial System (UAS), and Smart Grid.

8. The method according to claim 6, further comprising:

receiving, from the third network function, registration information indicating the EAS ID of the third network function, an endpoint of the third network function, and relationship between the second network function and the third network function; and storing the registration information in the first list of associated EAS information.

9. The method according to claim 6, further comprising:

receiving, from the third network function, registration information indicating the EAS profile of the respective third network function; and storing the registration information in the first list of associated EAS information.

10. The method according to claim 6, wherein the second network function is implemented as Service Enabler Architecture Layer (SEAL) server for the vertical application, and the third network function is implemented as Vertical Application Layer (VAL) server, and wherein the SEAL server manages a procedure of the VAL server.

11. The method according to claim 10, wherein the SEAL server includes a SEAL Identity Management (IM) server and wherein the SEAL IM server provides Token Validation service to the VAL server for validating a token which was allocated by the SEAL IM server.

12. The method according to claim 11, wherein the token is an access token, an ID token, or both the access token and the ID token.

13. The method according to claim 11, wherein the VAL server is an FF Application Specific (FFAS) server or an FF Application Enabler (FAE) server.

14. The method according to claim 6, wherein the second network function is implemented as FF Application Enabler (FAE) server and the third network function is implemented as FF Application Specific (FFAS) server.

15. A method performed by a first functional component in a User Equipment (UE), comprising:

transmitting, to a first network function implementing Edge Enabler Server (EES) in an Edge Data Network (EDN), a first message for discovering at least one second network function implementing Edge Application Server (EAS) in the EDN; and receiving, from the first network function, a second message including information indicating a first list of associated EAS information, wherein the first list of associated EAS information comprising at least one first entry for at least one third network function implementing EAS in the EDN respectively, each first entry indicating EAS profile of respective third network function, and wherein the EAS profile of the respective third network function includes an ID of the EAS (EAS ID) of the respective third network function and a relationship between a respective second network function and the respective third network function.

16. The method according to claim 15, wherein the information indicating the first list of associated EAS information is included in an EAS profile of the at least one second network function.

17. The method according to claim 15, wherein the first message further comprises an indicator explicitly indicating EAS association.

* * * * *